United States Patent
Miyagi et al.

(10) Patent No.: US 7,535,595 B2
(45) Date of Patent: May 19, 2009

(54) IMAGE PROCESSING APPARATUS AND METHOD, AND COMPUTER PROGRAM PRODUCT

(75) Inventors: Noriko Miyagi, Kanagawa (JP); Hiroyuki Shibaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 853 days.

(21) Appl. No.: 10/760,460

(22) Filed: Jan. 21, 2004

(65) Prior Publication Data

US 2004/0252316 A1 Dec. 16, 2004

(30) Foreign Application Priority Data

Jan. 21, 2003 (JP) .............................. 2003-012796

(51) Int. Cl.
*G03H 1/00* (2006.01)

(52) U.S. Cl. ......................................... 358/1.9; 358/1.1

(58) Field of Classification Search ........................ None
See application file for complete search history.

(56) References Cited

U.S. PATENT DOCUMENTS

| | | | |
|---|---|---|---|
| 5,464,200 | A | 11/1995 | Nakazato et al. |
| 5,482,265 | A | 1/1996 | Nakazato et al. |
| 5,708,949 | A | 1/1998 | Kasahara et al. |
| 5,797,074 | A | 8/1998 | Kasahara et al. |
| 5,960,246 | A | 9/1999 | Kasahara et al. |
| 6,556,707 | B1 | 4/2003 | Yagishita et al. |
| 6,647,125 | B2 * | 11/2003 | Matsumoto et al. ......... 382/100 |
| 6,650,437 | B1 * | 11/2003 | Nakajima .................... 358/1.9 |
| 2004/0252316 | A1 | 12/2004 | Miyagi et al. |

FOREIGN PATENT DOCUMENTS

| | | |
|---|---|---|
| JP | 4-10765 | 1/1992 |
| JP | 5-308526 | 11/1993 |
| JP | 8-98016 | 4/1996 |
| JP | 9-186866 | 7/1997 |

OTHER PUBLICATIONS

U.S. Appl. No. 11/342,536, filed Jan. 31, 2006, Miyagi.
U.S. Appl. No. 11/359,385, filed Feb. 23, 2006, Miyahara et al.
U.S. Appl. No. 10/238,784, filed Sep. 11, 2002, Miyagi et al.
U.S. Appl. No. 10/287,630, filed Nov. 5, 2002, Miyagi et al.

(Continued)

*Primary Examiner*—Edward L Coles
*Assistant Examiner*—Marcus T Riley
(74) *Attorney, Agent, or Firm*—Oblon, Spivak, McClelland, Maier & Neustadt, P.C.

(57) ABSTRACT

An image processing apparatus includes a communication unit configured to exchange data with an external device, an attribute determination unit, an embedding unit, and a storage unit. The attribute determination unit determines an image attribute of a first image signal to generate an attribute signal indicating the image attribute. The embedding unit embeds the attribute signal in the first image signal in a predetermined format to obtain a second image signal. The storage unit stores the attribute signal and one of the first image signal and the second image signal. The second image signal is transmitted to the external device through the communication unit.

19 Claims, 11 Drawing Sheets

OTHER PUBLICATIONS

U.S. Appl. No. 10/119,957, filed Apr. 11, 2002, Morimoto et al.
U.S. Appl. No. 10/188,133, filed Jul. 3, 2002, Suino et al.
U.S. Appl. No. 07/987,189, filed Dec. 8, 1992, Nakazato et al.
U.S. Appl. No. 08/038,834, filed Mar. 29, 1993, Adachi et al.
U.S. Appl. No. 09/473,647, filed Dec. 28, 1999, Okubo et al.
U.S. Appl. No. 09/663,843, filed Sep. 15, 2000, Okubo et al.
U.S. Appl. No. 09/775,601, filed Feb. 5, 2001, Shibaki et al.
U.S. Appl. No. 10/391,211, filed Mar. 19, 2003, Morimoto et al.
U.S. Appl. No. 10/760,460, filed Jan. 21, 2004, Miyagi et al.
U.S. Appl. No. 12/180,821, filed Jul. 28, 2008, Shibaki, et al.

* cited by examiner

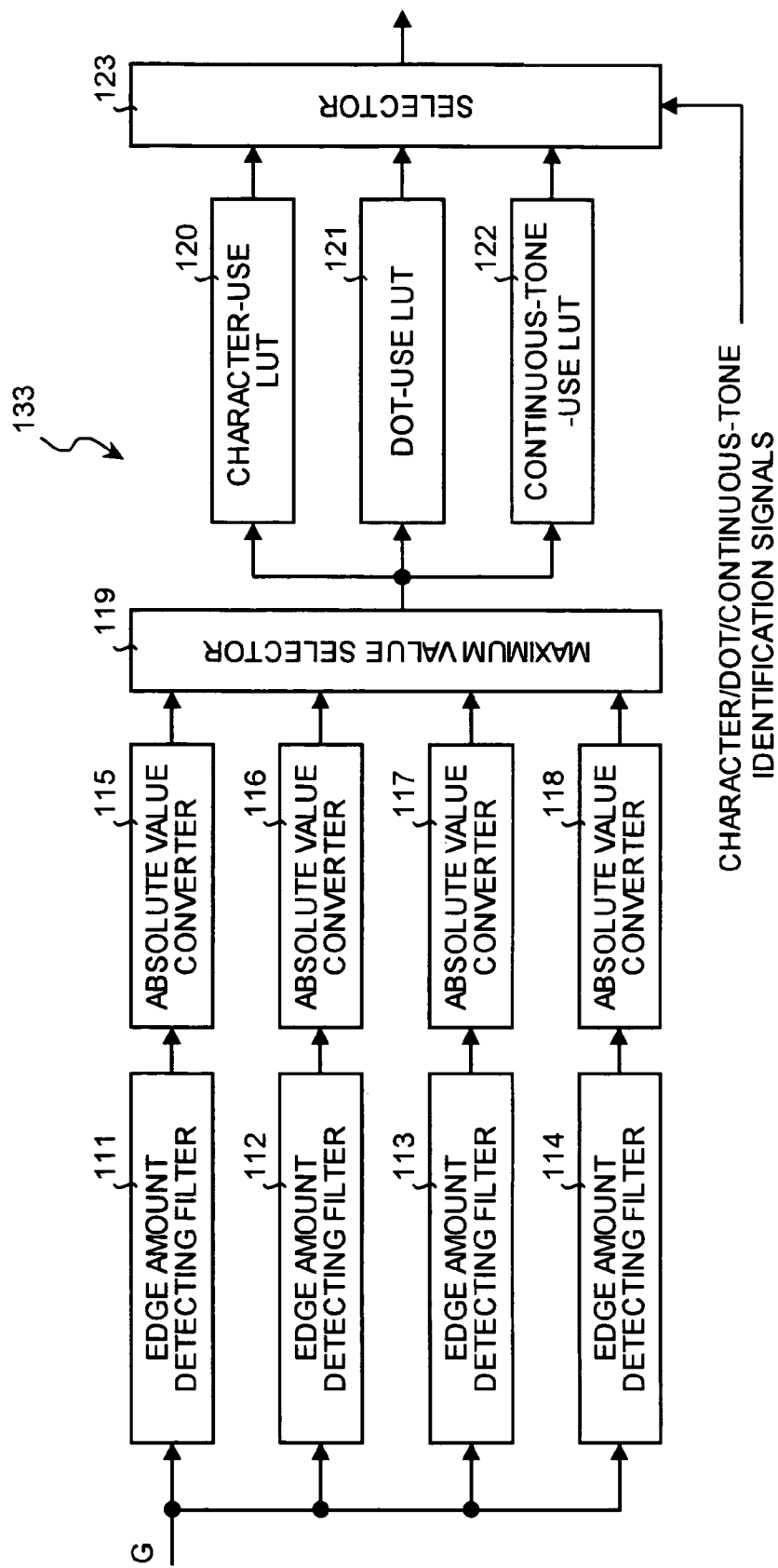

FIG.5A

| -1 | -1 | -1 | 0 | 1 | 1 | 1 |
|----|----|----|---|---|---|---|
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |

FIG.5B

| -1 | -1 | -1 | -1 | -1 | -1 | -1 |
|----|----|----|----|----|----|----|
| -1 | -1 | -1 | -1 | -1 | -1 | -1 |
| -1 | -1 | -1 | -1 | -1 | -1 | -1 |
| 0  | 0  | 0  | 0  | 0  | 0  | 0  |
| 1  | 1  | 1  | 1  | 1  | 1  | 1  |
| 1  | 1  | 1  | 1  | 1  | 1  | 1  |
| 1  | 1  | 1  | 1  | 1  | 1  | 1  |

FIG.5C

| 0  | 1  | 1  | 1  | 1  | 1  | 1 |
|----|----|----|----|----|----|---|
| -1 | 0  | 1  | 1  | 1  | 1  | 1 |
| -1 | -1 | 0  | 1  | 1  | 1  | 1 |
| -1 | -1 | 0  | 0  | 1  | 1  | 1 |
| -1 | -1 | -1 | -1 | 0  | 1  | 1 |
| -1 | -1 | -1 | -1 | -1 | 0  | 1 |
| -1 | -1 | -1 | -1 | -1 | -1 | 0 |

FIG.5D

| 1 | 1 | 1 | 1 | 1  | 1  | 0  |
|---|---|---|---|----|----|----|
| 1 | 1 | 1 | 1 | 1  | 0  | -1 |
| 1 | 1 | 1 | 1 | 0  | -1 | -1 |
| 1 | 1 | 1 | 0 | -1 | -1 | -1 |
| 1 | 1 | 0 | -1| -1 | -1 | -1 |
| 1 | 0 | -1| -1| -1 | -1 | -1 |
| 0 | -1| -1| -1| -1 | -1 | -1 |

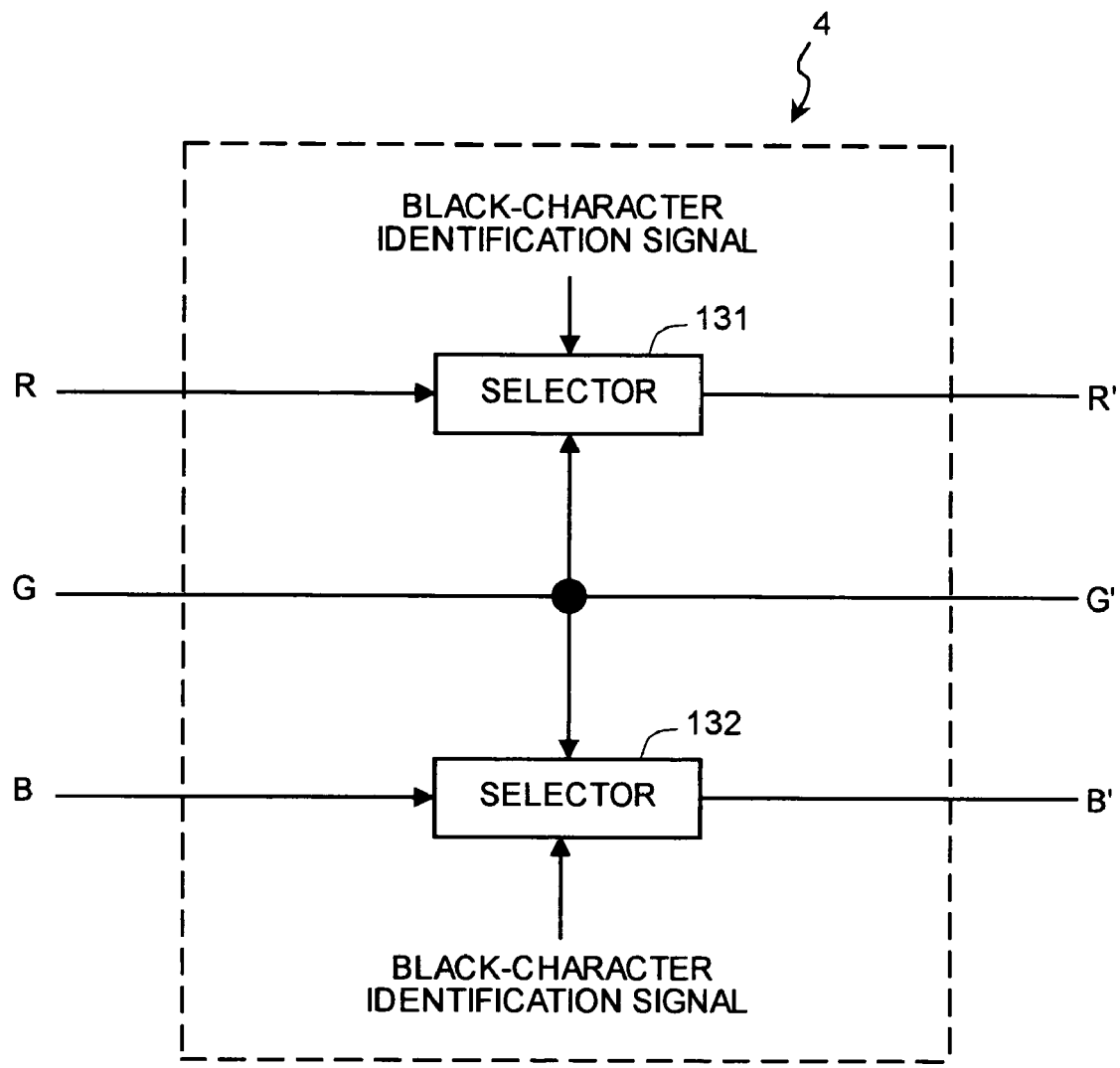

● BLACK PIXEL CANDIDATE
TARGET PIXEL AT CENTER

—— LUT FOR BLACK CHARACTER
--- LUT FOR NON-BLACK CHARACTER

IMAGE PROCESSING APPARATUS AND METHOD, AND COMPUTER PROGRAM PRODUCT

CROSS-REFERENCE TO RELATED APPLICATIONS

The present document incorporates by reference the entire contents of Japanese priority document, 2003-012796 filed in Japan on Jan. 21, 2003

BACKGROUND OF THE INVENTION

1) Field of the Invention

The present invention relates to image processing apparatus and method, and a computer program product. More particularly, the present invention relates to the image processing apparatus, the image processing method, and the computer program product that are applied to a digital copying machine and a digital multifunction machine including a communication unit that performs data transmission and reception with an external device.

2) Description of the Related Art

An image processing apparatus of a digital color copying machine superposes four color toners of cyan, magenta, yellow, and black (CMYK) on one another to form a color image and a printer reproduces and outputs the color image. In such an image processing apparatus, a signal attribute of an image signal input from a scanner refers to red, green, and blue (RGB), and therefore, color correction and undercolor removal (UCR)-black generation are performed on the signal attribute to convert RGB to CMYK signals corresponding to the printer and toner characteristics, and the CMYK signals are output to the printer.

Most of the recent digital color copying machines have an image area separating function. The image area separating function is a function of identifying a black character, a color character, a dot-photograph portion, and a solid portion through image area separation. Therefore, this function is effective in acquisition of high-quality output image in a document with a plurality of image types mixed therein by performing appropriate image processing on each image area.

Reproduction of a high-quality black character in particular is demanded of color images. Consequently, the process of reproducing the black character identified through the image area separation with a black (K) single color becomes inevitable. This is because if the black character is reproduced with CMY(K), a colored portion is produced around the black character due to color misalignment that may occur on output by a printer, and this colored portion causes noticeable degradation in image quality. On the other hand, reproduction of the black character with the K single color is not affected by the color misalignment.

However, in the operation of the image area separation, there are two largely different types of processing for the black color in a black character portion and a photograph portion. More specifically, the K single color is used to reproduce the black character portion, while much of the CMY colors are used to reproduce the photograph portion for its gradation and graininess. These types of processing are switched based on a result of separation. Therefore, if the black character portion is failed to be identified properly, a boundary as the switched portion of the two types of processing may be sometimes visually recognized, which causes significant degradation in image quality. As explained above, identification with high accuracy is required for the image area separation.

In the recent tendency of the digital copying machines, a device as follows is known. In the device, an image signal input through a scanner is stored in a hard disk, and the image signal is once output by a printer, and then the same image signal can be output again by the printer without reading the same image signal through the scanner.

As explained above, there are various approaches to using the image signals stored in the hard disk, as follows. The image signal stored in the hard disk is transmitted or output to an external printer through an external interface. Alternatively, the image signal is transmitted to an external personal computer (PC), is edited by application software therein, and the edited image signal is returned again to the hard disk, and is output by the printer.

It is preferable that the signal attribute of the image signal stored in the hard disk is RGB or YCbCr. Because if the image signal with the image attribute of CMYK is stored, color characteristic and density characteristic are changed when the image signal is output by an external printer having different characteristic because CMYK are signals corresponding to the characteristics of the printer and toner. If the image signal with the image attribute of CMYK is stored in the PC, an image with the image signal cannot be viewed in many cases by general-purpose application software. Furthermore, if the image signal with the image attribute of CMYK is stored in the hard disk, memory is further taken up by one color. In addition, if calibration is performed during operation, then a desired color or density may not be output.

It is assumed that the image signal stored in the hard disk is RGB signals (data before the processing of UCR-black generation). For example, the image signal is subjected to processing by Joint Photographic Experts Group (JPEG) baseline compression technique (RGB is converted to YCbCr and is irreversibly compressed), and then the compressed image signal is stored in the hard disk. The compression is not limited to JPEG, but it is effective to use an irreversible compression format such as JPEG in order to make. effective use of memory space.

A case where the image area separation is executed by a signal before compression that is not affected by mosquito noise, block distortion, or degradation in sharpness is more excellent in identification accuracy. Therefore, the execution with the signal is effective in the image area separation that requires high identification accuracy. In order to use a black-character identification signal identified through the image area separation in the processing of UCR-black generation as a processing in a downstream stage of the compression, the black-character identification signal has to be brought into the downstream stage. Technologies to bring the black-character identification signal into the downstream stage are as follows. It is noted that Japanese Patent Application Laid Open (JP-A) Nos. Hei 4-10765 and Hei 5-308526 disclose image processing apparatuses with a first "method of storing an image-area identification signal in memory", and JP-A No. Hei 8-98016 discloses an image processing apparatus with a second "method of merging an image-area identification signal in an image signal".

The image processing apparatus disclosed in JP-A No. Hei 4-10765 reads a document and inputs image formation according to the document, compresses the image formation to be stored page by page, reads the stored image formation at a predetermined timing, and decompresses it to be output to a recording unit. This image processing apparatus includes an input unit that inputs image information, a compressor that irreversibly compresses the input image formation, and a storage unit that stores the compressed image formation. The image processing apparatus also includes a decompressor that decompresses the stored image formation, and a detector that detects edge information and color information based on the image formation after being input by the input unit but before being irreversibly compressed by the compressor and stores them. The image processing apparatus further includes a processor that performs processing so as to improve reproducibility on the image information that is read at the predetermined timing and decompressed, based on the stored edge information and color information. In other words, in the image processing apparatus disclosed in JP-A Hei 4-10765, in addition to the image signal, a black-character identification signal is also stored in memory, and both of them are brought into the downstream stage.

The image processing apparatus disclosed in JP-A No. Hei 5-308526 has a function of compressing an image signal that has been subjected to color separation and storing the compressed image signal. The image processing apparatus includes an attribute determining unit that determines an attribute of an image based on the image signal, a storage unit that stores a result of the determination, and a converter that converts the resolution as the result of the determination according to compression of the image signal. In other words, in the image processing apparatus disclosed in JP-A Hei 5-308526, the resolution of a black-character identification signal is converted to a reduced resolution to be stored in memory in order to economize on memory usage.

The image processing apparatus disclosed in JP-A No. Hei 8-98016 merges an image signal with a separation result. The image processing apparatus includes an image area separator that detects a black character area of an image, a separation-result merging unit that merges a result of separation with an image signal using a predetermined format, and a separation-result extracting unit that extracts the separation result from the image signal merged by the separation-result merging unit. The above-mentioned merger between the image signal and the separation result is performed by using the predetermined format such that the image is expressed by the image signal using a RGB color system, and the same values are set to an R signal, a G signal, and a B signal (R=G=B) for pixels indicating the black character area.

The demerits of the first "method of storing an image-area identification signal in memory" are such that the memory space is required more by an amount of a storage of the image-area identification signal. If the image-area identification signal is added to the image signal and they are transmitted to the external device from an external interface, a data amount is increased and versatility of the image signal is lost. Therefore, it is desirable to transmit only the image signal. However, if the image signal without the image-area identification signal is transmitted and is returned to hardware again through the external interface after the image is edited in PC, no corresponding separation result exists, and therefore there is no means to perform black character processing.

On the other hand, the merits of the first "method of storing an image-area identification signal in memory" are such that if the image-area identification signal is stored in a hard disk in an non-compression format or a reversible compression format, the image-area identification signal can be brought into the downstream stage without degradation in image quality. This allows improved accuracy of the image-area identification signal. These merits are opposite to the demerits from the viewpoint of the memory space. However, the image-area identification signal has not so many bits, and there is a unit for reducing the resolution for storage. Moreover, as hard disks are currently available at lower cost, an increase in memory capacity to be taken up by such an amount is not particularly a significant matter.

The demerits of the second "method of merging an image-area identification signal in an image signal" are such that if R=G=B pixels as black character code are embedded in the image signal and the black character code is extracted from the image signal, it is difficult to discriminate the black character code from the R=G=B pixels in a non-black character portion. If the non-black character portion is chromatized in advance or if the data used as the black character code is set to a lower pixel value that occurs at less frequency than that of the R=G=B pixels, it is possible to improve the identification accuracy. In any of the cases, the merged image signal is subjected to irreversible compression such as JPEG. Therefore, before and after the compression, the embedded black character code may be changed to a value that does not indicate the black character code, or the pixel that is not the black character code may be changed to the black character code. The merged image signal may also be affected by degradation due to variable magnification depending on a process flow.

The merits of the second "method of merging an image-area identification signal in an image signal" are such that as the image-area identification signal is merged in the image signal, the image signal can be transmitted to the external device without loss of versatility. In addition, the merged black character code can be held even in the image signal that is output to the external PC once and returned again to the hard disk.

SUMMARY OF THE INVENTION

It is an object of the present invention to at least solve the problems in the conventional technology.

An image processing apparatus according to one aspect of the present invention includes a communication unit configured to exchange data with an external device; an attribute determination unit that determines an image attribute of a first image signal to generate an attribute signal indicating the image attribute; an embedding unit that embeds the attribute signal in the first image signal in a predetermined format to obtain a second image signal; and a storage unit that stores the attribute signal and one of the first image signal and the second image signal. The second image signal is transmitted to the external device through the communication unit.

An image processing method according to another aspect of the present invention includes determining an image attribute of a first image signal to generate an attribute signal indicating the image attribute; embedding the attribute signal in the first image signal in a predetermined format to obtain a second image signal; storing the attribute signal and one of the first image signal and the second image signal; and transmitting the second image signal to an external device.

The computer program product according to still another aspect of the present invention realizes the method according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a block diagram of a detailed configuration of an edge amount calculator of FIG. 3;

FIG. 5A to FIG. 5D are examples of a primary differential filter;

FIG. 6 is a block diagram of a detailed configuration of a code embedding unit of FIG. 1;

DETAILED DESCRIPTION

Exemplary embodiments of the image processing apparatus and method and the computer program product according to the present invention are explained in detail below with reference to the accompanying drawings. The example of the image processing apparatus applied to a digital color copying machine is explained in the embodiments. It is noted that "attribute determination signal" in this specification represents a signal indicating an image attribute, and specifically indicates at least one of a black-character identification signal, a color-character identification signal, a character identification signal, a dot identification signal, and a continuous-tone identification signal.

An image processing apparatus according to a first embodiment of the present invention is explained below with reference to FIG. 1 to FIG. 8.

Figure 1:
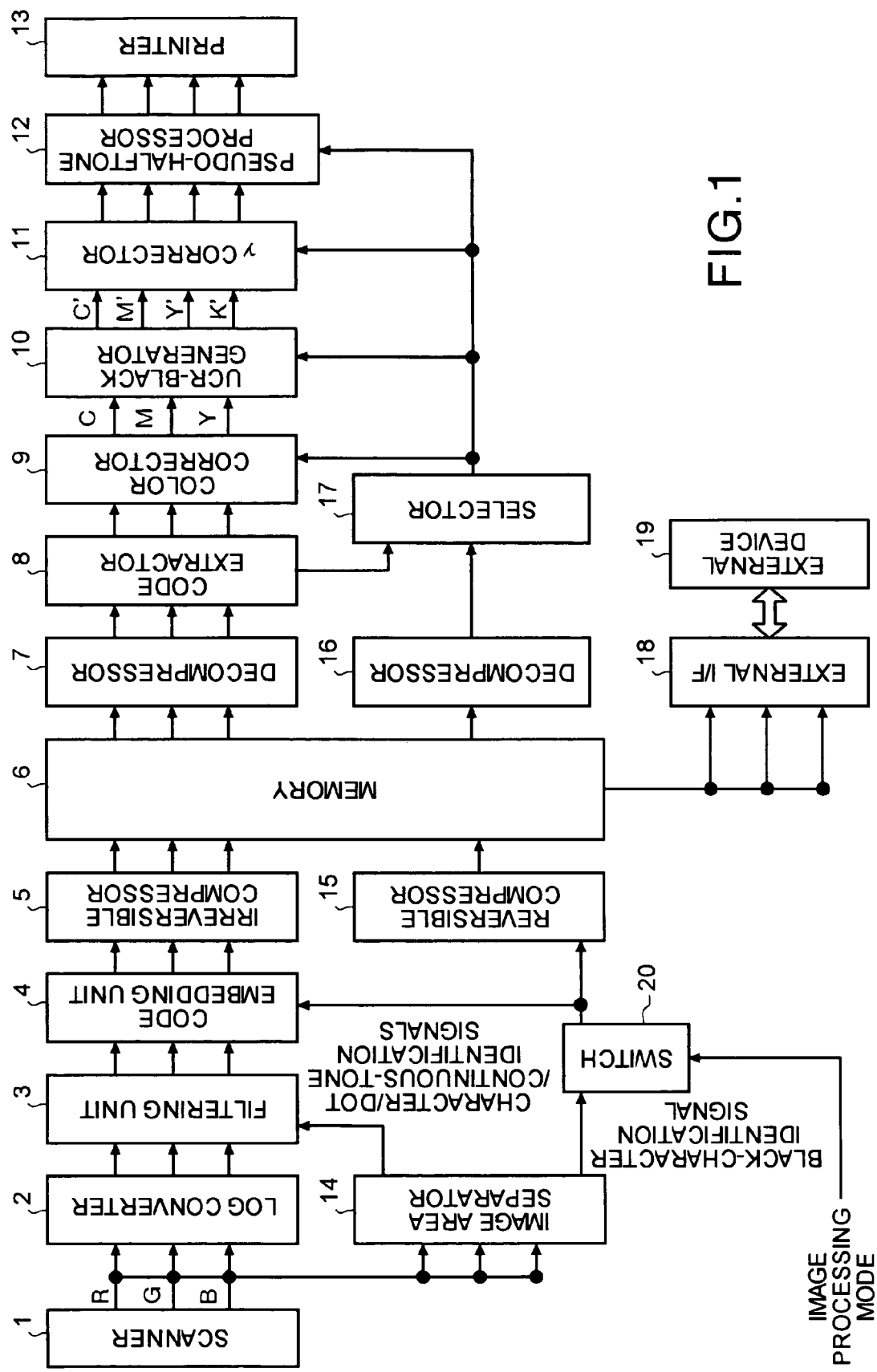
FIG. 1 is a block diagram of an overall configuration of an image processing apparatus according to a first embodiment of the present invention.

FIG. 1 is a block diagram of the overall configuration of the image processing apparatus according to the first embodiment. The image processing apparatus includes a scanner 1, a LOG converter 2, a filtering unit 3, a code embedding unit 4, an irreversible compressor 5, a memory 6, a decompressor 7, a code extractor 8, a color corrector 9, a UCR-black generator 10, a γ corrector 11, a pseudo-halftone processor 12, a printer 13, an image area separator 14, a reversible compressor 15, a decompressor 16, a selector 17, an external interface (I/F) 18, and a switch 20. An external device 19 is connected to the external I/F 18. In the image processing apparatus of FIG. 1, a controller (not shown) controls timings and operations of the components.

The schematic operation of the image processing apparatus of FIG. 1 is explained below. The scanner 1 optically scans a color document, converts scanned data to digital RGB signals, and outputs the digital RGB signals to the LOG converter 2 and the image area separator 14.

The LOG converter 2 performs LOG conversion on the digital RGB signals with linear reflectivity input from the scanner 1 using a lookup table (LUT), converts the converted RGB signals to RGB signals with linear density, and outputs the RGB signals with linear density to the filtering unit 3.

The image area separator 14 determines image area attributes (image attribute) of the RGB signals input through the scanner 1 pixel by pixel, and outputs a character identification signal indicating a character area, a dot identification signal indicating a dot area, and a continuous-tone identification signal indicating a continuous tone area to the filtering unit 3. Further, the image area separator 14 outputs a black-character identification signal indicating a black character area to the switch 20. The detailed configuration of the image area separator 14 is explained later.

The filtering unit 3 performs filtering process on the RGB signals input from the LOG converter 2 based on the character identification signal, the dot identification signal, and the continuous-tone identification signal input from the image area separator 14, and outputs the processed RGB signals to the code embedding unit 4. More specifically, the filtering is performed in such a manner that the irregularities of a dot portion are prevented to suppress moire while the sharpness of the character portion is enhanced. The detailed configuration of the filtering unit 3 is explained later.

The switch 20 switches on or off an output of the black-character identification signal input from the image area separator 14, to the code embedding unit 4 and the reversible compressor 15 according to an image processing mode signal input from the controller (not shown). More specifically, in character mode, the switch 20 outputs the black-character identification signal to the code embedding unit 4 and the reversible compressor 15. In photograph mode of photographic paper, the black-character identification signal input from the image area separator 14 is not subjected to black character processing because it is regarded that there is no black character in the document. Consequently, the switch 20 does not output the black-character identification signal to the code embedding unit 4 and the reversible compressor 15.

The code embedding unit 4 embeds the black-character identification signal input from the switch 20 in the processed RGB signals input from the filtering unit 3, in black character code (code that can be extracted) format (predetermined format) that indicates a black character, and outputs the RGB signals with the embedded black-character identification signal to the irreversible compressor 5. The detailed configuration of the code embedding unit 4 is explained later.

The irreversible compressor 5 performs irreversible compression such as JPEG on the RGB signals input from the code embedding unit 4, and stores the compressed RGB signals in the memory 6.

The reversible compressor 15 performs reversible compression on the black-character identification signal input from the switch 20, and stores the compressed black-character identification signal in the memory 6.

The memory 6 includes a hard disk, and stores the RGB signals that have been irreversibly compressed in the irreversible compressor 5 and the black-character identification signal that has been reversibly compressed in the reversible compressor 15 in a correspondence with each other. The data stored in the memory 6 is maintained until an erase instruction is issued from the controller.

The decompressor 7 reads the RGB signals irreversibly compressed and stored in the memory 6, and decompresses the RGB signals to be output to the code extractor 8. The decompressor 16 reads the black-character identification signal reversibly compressed and stored in the memory 6, and decompresses the black-character identification signal to be output to the selector 17.

The code extractor 8 extracts the black-character identification signal from the decompressed RGB signals and outputs the extracted black-character identification signal to the selector 17, and also outputs the decompressed RGB signals to the color corrector 9. The detailed configuration of the code extractor 8 is explained later.

The selector 17 selects one of the black-character identification signal that is stored in the memory 6 and input from the decompressor 16 and the black-character identification signal extracted in the code extractor 8. The selector 17 outputs the selected one to the color corrector 9, the UCR-black generator 10, the γ corrector 11, and the pseudo-halftone processor 12. More specifically, if the black-character identification signal is stored in the memory 6, then the selector 17 selects the black-character identification signal stored in the memory 6. On the other hand, if no black-character identification signal is stored in the memory 6, then the selector 17 selects the black-character identification signal extracted in the code extractor 8. The color corrector 9, the. UCR-black generator 10, the γ corrector 11, and the pseudo-halftone processor 12 are controlled by using the black-character identification signal selected in the selector 17.

The color corrector 9 converts the RGB signals input from the code extractor 8 to CMY signals suitable for a color material of a printer system by masking calculation or the like according to the black-character identification signal input from the selector 17, and outputs the CMY signals to the UCR-black generator 10.

The UCR-black generator 10 subjects the CMY signals input from the color corrector 9 to UCR-black generation to be converted to C'M'Y'K' signals according to the black-character identification signal input from the selector 17, and outputs the C'M'Y'K' signals to the γ corrector 11. The detailed processing of the UCR-black generator 10 is explained later.

The γ corrector 11 performs conversion on the C'M'Y'K' signals input from the UCR-black generator 10 using one of density conversion tables to match the density characteristic of the printer 13, according to the black-character identification signal input from the selector 17. Then, the γ corrector 11 converts the C'M'Y'K' signals to linear signals suitable for the output characteristic of the printer 13 to be output to the pseudo-halftone processor 12. The γ corrector 11 is controlled according to the contents of the processing in the pseudo-halftone processor 12. Therefore, the γ corrector 11 corrects a difference between tone characteristics caused by the contents of the pseudo-halftone processing of the pseudo-halftone processor 12 so as to obtain the same density reproduction. The density conversion tables are switched according to the contents of the processing in the pseudo-halftone processor 12.

The pseudo-halftone processor 12 performs adaptable pseudo-halftone processing on the converted C'M'Y'K' signals input from the γ corrector 11 so as to enhance the sharpness of a black character image according to the black-character identification signal input from the selector 17, and outputs the processed C'M'Y'K' to the printer 13. For example, dithering can be used for the pseudo-halftone processing, and the number of dither lines is switched according to the black-character identification signal. If the output resolution of the printer is 600 dpi, the dither line of 300 lines is used to perform tone reproduction on the black character, and the dither line of 200 lines is used to perform tone reproduction on the non-black character.

The printer is, for example, a laser printer, and prints an image according to the C'M'Y'K' signals input from the pseudo-halftone processor 12 on a recording material such as a recording paper.

The external I/F 18 performs transmission and reception of data such as image signal with the external device 19. More specifically, the external I/F 18 transmits the image signal stored in the memory 6 to the external device 19 and receives the image signal transmitted from the external device 19, and stores the received image signal in the memory 6. The external device 19 is, for example, a personal computer and a printer.

When data is transmitted to the external device 19, the external I/F 18 transmits only RGB signals with the embedded black-character identification signal but does not transmit the corresponding black-character identification signal. This is because when an image is edited on the external device 19, the black-character identification signal is a nuisance in handling except for a copying flow. When the RGB signals with the embedded black-character identification signal are transmitted to the external device 19, the corresponding black-character identification signal stored in the memory 6 is deleted. As explained above, in such a case that the RGB signals with the embedded black-character identification signal are transmitted to the external device 19, editing such as writing of a comment in the RGB signals is performed on the RGB signals on the external device 19, and the RGB signals are then taken into the memory 6 through the external I/F 18 again, the corresponding black-character identification signal does not exist in the memory 6.

When the RGB signals with the embedded black-character identification signal received from the external device 19 and stored in the memory 6 is to be printed out, only the RGB signals with the embedded black-character identification signal are output to the downstream stage. The code extractor 8 extracts the black-character identification signal from the RGB signals with the embedded black-character identification signal, and performs image processing, according to the extracted black-character identification signal, on the RGB signals with the embedded black-character identification signal.

As explained above, since only the RGB signals with the embedded black-character identification signal are transmitted to the external device 19, the RGB signals are handled in the external device 19 as an unspecified image. Furthermore, since the black-character identification signal is embedded in the RGB signals, the black-character identification signal is always held in correlation with the RGB signals. When the RGB signals are edited in the external device 19, the black-character identification signal is automatically changed in response to the editing.

It is noted that there is a method of relating the black-character identification signal again to the corresponding image signal before its transmission to the external device 19. However, an identification key or the like indicating their relation is required to be added to the image signal so that the identification key is prevented from being easily lost by any alteration. Therefore, this method is quite hard to be realized. By editing the image signal, no correspondence occurs between the image signal and the black-character identification signal at an edited portion. Thus, it is not preferable to use the edited image signal and perform image processing in the downstream stage.

Figure 2:
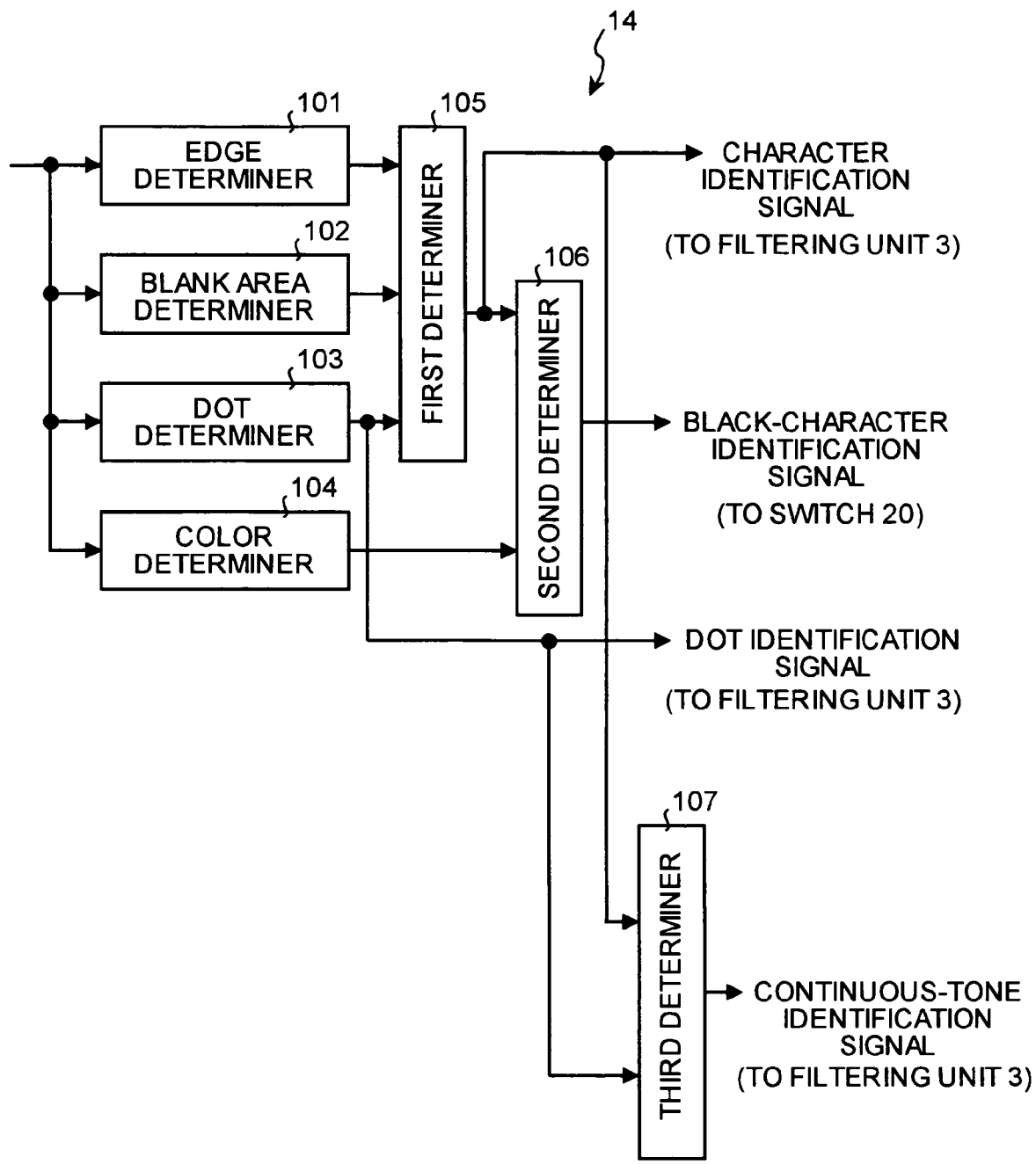
FIG. 2 is a block diagram of a detailed configuration of an image area separator of FIG. 1.

The image area separator 14 determines image area attributes of the RGB signals input from the scanner 1 pixel by pixel, outputs the character identification signal, the dot identification signal, and the continuous-tone identification signal to the filtering unit 3, and also outputs the black-character identification signal to the switch 20. FIG. 2 is a block diagram of the detailed configuration of the image area separator 14.

The image area separator 14 includes an edge determiner 101, a blank area determiner 102, a dot determiner 103, a color determiner 104, a first determiner 105, a second determiner 106, and a third determiner 107. The image area separator 14 performs known image area separation processing, for which various methods are disclosed. Therefore, detailed explanation thereof is omitted here.

For the edge determiner 101 and the dot determiner 103, the following methods can be employed. That is, one of them is a method of "4.2 Edge area detection" and another one is a method of "4.1 Dot area detection" by detecting a peak pixel, described in "Image area separation method of-character/pattern (dot, photograph)-mixed image" The Institute of Electronics, Information and Communication (IEICE) Vol. J75-D2, 1992-1. For the blank area determiner 102 and the color determiner 104, a blank background detecting circuit and an achromatic area detecting circuit described in JP-A No. Hei 4-14378 can be used.

The edge determiner 101 performs edge determination on the RGB signals input from the scanner 1, and outputs results of the edge determination as "1" for an edge pixel and as "0" for a non-edge pixel to the first determiner 105. The blank area determiner 102 performs blank area determination on the RGB signals input from the scanner 1, and outputs results of the blank area determination as "1" for a blank area pixel and as "0" for a non-blank area pixel to the first determiner 105. The dot determiner 103 performs dot determination on the RGB signals input from the scanner 1, and outputs results of the dot determination as "1" for a dot pixel and as "0" for a non-dot pixel to the first determiner 105, the third determiner 107, and the filtering unit 3. The color determiner 104 performs color determination on the RGB signals input from the scanner 1, and outputs results of the color determination as "1" for a color pixel and as "0" for a non-color pixel to the second determiner 106.

The first determiner 105 determines whether the respective results of the determinations input from the edge determiner 101, the blank area determiner 102, and the dot determiner 103 indicate the edge pixel, the blank area pixel, and the non-dot pixel. When the results indicate the edge pixel, the blank area pixel, and the non-dot pixel, the first determiner 105 outputs a character identification signal indicating a character on the blank area as character "1", to the filtering unit 3, the second determiner 106, and the third determiner 107.

The second determiner 106 determines whether the character identification signal input from the first determiner 105 indicates the character pixel and whether the result of color determination input from the color determiner 104 indicates the achromatic pixel. When the results of the determination indicate the character pixel and the achromatic pixel, the second determiner 106 outputs a black-character identification signal as "1" to the switch 20.

The third determiner 107 determines whether the character identification signal input from the first determiner 105 is "0" and whether the dot identification signal input from the dot determiner 103 is "0". When the results of determination are "0", the third determiner 107 outputs a continuous-tone identification signal as "1" to the filtering unit 3.

The filtering unit 3 performs filtering on the RGB signals input from the LOG converter 2 based on the character identification signal, the dot identification signal, and the continuous-tone identification signal input from the image area separator 14, and outputs the processed RGB signals to the code embedding unit 4. More specifically, the filtering is performed in such a manner that the irregularities of a dot portion are prevented to suppress moire while the sharpness of the character portion is enhanced.

Figure 3:
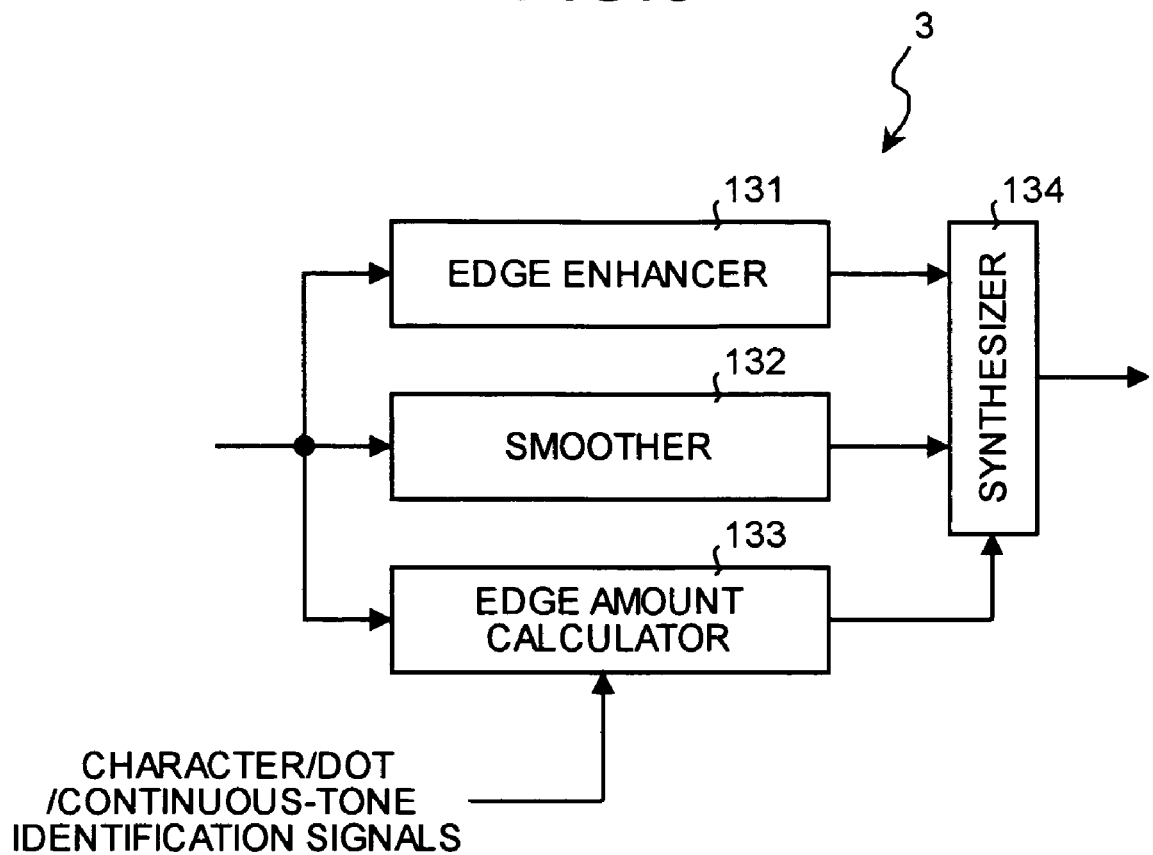
FIG. 3 is a block diagram of a detailed configuration of a filtering unit of FIG. 1.

FIG. 3 is a block diagram of the detailed configuration of the filtering unit 3. The filtering unit 3 includes an edge enhancer 131, a smoother 132, an edge amount calculator 133, and a synthesizer 134.

The edge enhancer 131 performs edge enhancement on the RGB signals input from the LOG converter 2, and outputs edge-enhanced RGB signals to the synthesizer 134. The smoother 132 performs smoothing on the RGB signals input from the LOG converter 2, and outputs the smoothed RGB signals to the synthesizer 134. The edge amount calculator 133 detects an edge amount of the RGB signals input from the LOG converter 2, and outputs the edge amount to the synthesizer 134.

The synthesizer 134 synthesizes the edge-enhanced RGB signals and the smoothed RGB signals at a ratio based on the edge amount, and outputs the synthesis of the RGB signals to the code embedding unit 4. More specifically, the synthesizer 134 performs synthesis processing in such a manner that the proportion of the output result of the edge enhancer 131 is made larger if the edge amount is large, and the proportion of the output result of the smoother 132 is made larger if the edge amount is small.

FIG. 4 is a block diagram of the detailed configuration of the edge amount calculator 133. The edge amount calculator 133 includes edge amount detecting filters 111 to 114, absolute value converters 115 to 118, a maximum value selector 119, a character-use LUT 120, a dot-use LUT 121, a continuous-tone-use LUT 122, and a selector 123.

Each of the edge amount detecting filters 111 to 114 includes primary differential filers of 7×7 matrix size as shown in FIG. 5A to FIG. 5D, and the primary differential filers detect an edge in a vertical direction, an edge in a horizontal direction, an edge in a left oblique direction, and an edge in a right oblique direction, respectively. The edge amount detecting filters 111 to 114 perform primary differential filtering on the G signal input from the LOG converter 2, and output the results of calculation to the absolute value converters 115 to 118, respectively. The signal used to detect an edge amount here is the G signal, but a luminance signal generated by synthesizing the RGB signals may be used. The example in the case of using the primary differential filters is explained, but secondary differential filters may be used. When the secondary differential filters are used, a high edge amount is calculated at a central part of a line, and therefore, this is sometimes effective in the edge enhancement. Further, the primary differential filters may be combined with the secondary differential filters or the matrix size may be changed according to purposes.

The absolute value converters 115 to 118 convert the results of the calculation input from the edge amount detecting filters 111 to 114, into absolute values, and output the absolute values to the maximum value selector 119.

The maximum value selector 119 selects the maximum value of the input four absolute values and outputs it as an edge amount signal to the character-use LUT 120, the dot-use LUT 121, and the continuous-tone-use LUT 122.

The character-use LUT 120 performs conversion using the LUT for character on the input edge amount signal, and outputs the converted edge amount signal to the selector 123. The dot-use LUT 121 performs conversion using the LUT for dots on the input edge amount signal, and outputs the converted edge amount signal to the selector 123. The continuous-tone-use LUT 122 performs conversion using the LUT for continuous tone on the input edge amount signal, and outputs the converted edge amount signal to the selector 123.

The selector 123 selects any of the edge amount signals input from the character-use LUT 120, the dot-use LUT 121, and the continuous-tone-use LUT 122 based on the character, dot, and continuous-tone identification signals input from the image area separator 14, and outputs a selected edge amount signal as an edge amount to the synthesizer 134.

More specifically, the selector 123 outputs the edge amount signal input from the character-use LUT 120 when the character identification signal is "1", outputs the edge amount signal input from the dot-use LUT 121 when the dot identification signal is "1", and outputs the edge amount signal input from the continuous-tone-use LUT 122 when the continuous-tone identification signal is "1".

The code embedding unit 4 embeds a black character code indicating a black character in the RGB signals when the black-character identification signal input from the switch 20 is "1", and outputs the RGB signals with the embedded black character code to the irreversible compressor 5.

FIG. 6 is a block diagram of the detailed configuration of the code embedding unit 4. The code embedding unit 4 includes selectors 131 and 132.

Of the RGB signals input from the filtering unit 3, the R signal and the G signal are input to the selector 131, and the selector 131 outputs the G signal instead of the R signal when the black-character identification signal input from the switch 20 is "1", i.e., the black pixel. The B signal and the G signal are input to the selector 132, and the selector 132 outputs the G signal instead of the B signal when the black-character identification signal input from the switch 20 is "1", i.e., the black pixel. As explained above, the code embedding unit 4 replaces the R signal and B signal with the G signal for a pixel that is determined in the image area separator 14 as a black character, by setting R=G=B data as a black character code.

Figure 7:
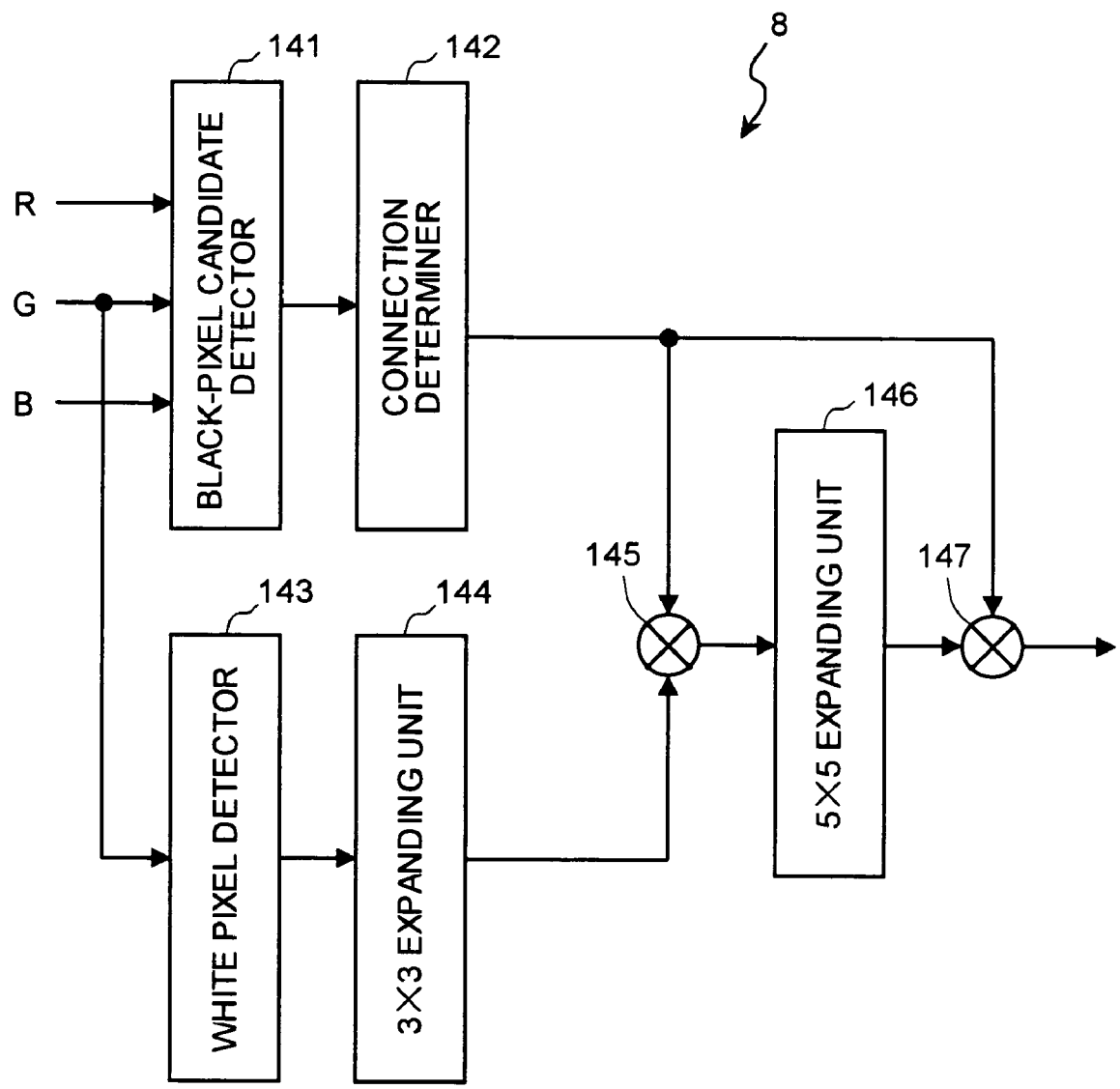
FIG. 7 is a block diagram of a detailed configuration of a code extractor of FIG. 1.

The code extractor 8 extracts the black-character identification signal from the decompressed RGB signals input from the decompressor 7, and outputs the extracted black-character identification signal to the selector 17. The code extractor 8 also outputs the decompressed RGB signals to the color corrector 9. FIG. 7 is a block diagram of the detailed configuration of the code extractor 8.

The code extractor 8 includes a black-pixel candidate detector 141, a connection determiner 142, a white pixel detector 143, a 3×3 expanding unit 144, a multiplier 145, a 5×5 expanding unit 146, and a multiplier 147.

The black-pixel candidate detector 141 determines whether a target pixel is R=G=B and G>th1 (th1: predetermined density threshold), on the RGB signals input from the decompressor 7. If the target pixel is "true", the black-pixel candidate detector 141 outputs the result of determination such that a black pixel candidate is "1".

Figure 8:
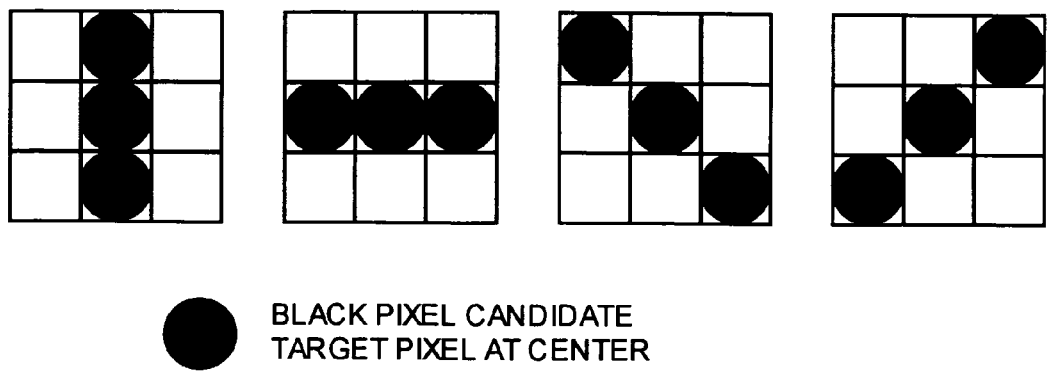
FIG. 8 is an illustration of patterns used for pattern matching.

The connection determiner 142 performs pattern matching on the result of determination input from the black-pixel candidate detector 141 based on the patterns shown in FIG. 8, and outputs the result of pattern matching to the multipliers 145 and 147. In the pattern matching, three neighboring pixels of black pixel candidates with a target pixel at a center thereof are detected in the vertical, horizontal, or oblique direction to remove an isolated pixel. This is because characteristics of the character image as follows are used. That is, the black-character identification signal does not exist in isolation as one dot or two dots but exists as a run of continuous black pixels. The pattern matching using the characteristics is incorporated also in, for example, an image area separator disclosed in JP-A No. Hei 4-14378. If such a detection is performed as an image area separation in the previous stage, the black-character identification signal is impossible to exist in isolation.

On the other hand, the white pixel detector 143 detects a white pixel in the G signal input from the decompressor 7, concurrently with detection of a black pixel candidate in the black-pixel candidate detector 141. The white pixel detector 143 then outputs the white pixel to the 3×3 expanding unit 144. As explained above, the black-character identification signal is an identification signal indicating a black character on the blank area, and therefore, white pixels surely exist around the black character. By using such characteristics, a black mass similar to a black character scattering in a pattern is eliminated using the white pixel. More specifically, the white pixel detector 143 determines whether the target pixel is R=G=B and G<th2 (th2: predetermined density threshold), and if the target pixel is "true", the white pixel detector 143 outputs the result of determination such that the white pixel is "1" to the 3×3 expanding unit 144.

The 3×3 expanding unit 144 performs 3×3 expansion on the white pixel detected by the white pixel detector 143, and outputs "1" to the multiplier 145 if even one white pixel exists within 3×3 pixels with the target pixel at the center thereof. The multiplier 145 outputs a first AND of the signals input from the connection determiner 142 and the 3×3 expanding unit 144, to the 5×5 expanding unit 146. Accordingly, 1 dot inward of a character is detected in a black character edge adjacent to the white pixel. As the black-character identification signal required for black character processing, 1 dot is not enough if a color misalignment of a printer is taken into account. Therefore, 3 dots are obtained in the following manner.

The 5×5 expanding unit 146 performs 5×5 expansion on the first AND input from the multiplier 145, and outputs "1" to the multiplier 147 if even one "1" exists within 3×3 pixels with the target pixel at the center thereof. The multiplier 147 outputs a second AND of the output of the 5×5 expanding unit 146 and the output of the connection determiner 142, to the selector 17 as the extracted black-character identification signal. Accordingly, the black character can be determined on up to 3 dots inward of a character, and a black-character identification area that extends toward the blank area side by 2 dots can be removed by the 5×5 expanding unit 146. The black-character identification area in the blank area side is removed because even if any area as a black character is erroneously extracted from the pattern, the erroneously extracted area is reduced as soon as possible so that degradation becomes unnoticeable.

As the filtering performed on the RGB signals in the previous stage before stored in the memory, JP-A No. 2001-78037 discloses a filtering process in a device as follows. In the device, by using a mechanism of minimizing a hollow part that occurs around a character by edge enhancing filters, for the character on a color base, an erroneous extraction in the pattern due to the first AND (multiplier 145) with the white pixel can be effectively prevented, thus it is possible to suppress the erroneous extraction to almost zero.

The color corrector 9 converts the RGB signals input from the code extractor 8 to CMY signals suitable for a color material of a printer system by masking calculation or the like according to the black-character identification signal input from the selector 17, and outputs the CMY signals to the UCR-black generator 10. The following equation (1) indicates an example of the masking calculation.

$$C = a0 + a1 \times R + a2 \times G + a3 \times B$$

$$M = b0 + b1 \times R + b2 \times G + b3 \times B$$

$$Y = c0 + c1 \times R + c2 \times G + c3 \times B \qquad (1)$$

Where a0 to a3, b0 to b3, and c0 to c3 are color correction parameters, which are determined so as to be C=M=Y when R=G=B. Two color correction parameter groups for a black character and a non-black character prepared in advance are switched according to the black-character identification signal.

The UCR-black generator 10 subjects the CMY signals input from the color corrector 9 to he processing of UCR-black generation to be converted to C'M'Y'K' signals according to the black-character identification signal input from the selector 17, and outputs the C'M'Y'K' signals to the γ corrector 11.

Figure 9:
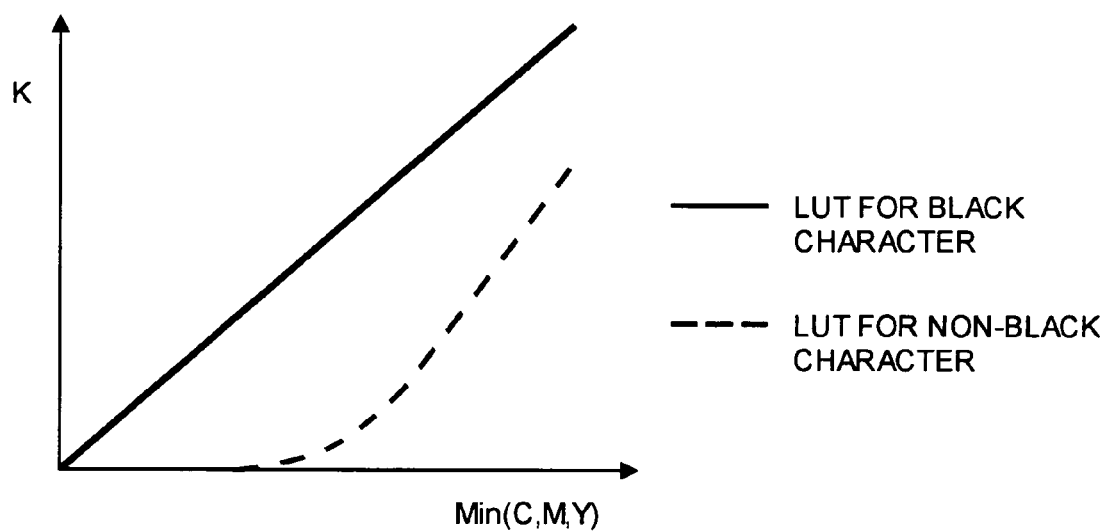
FIG. 9 is a diagram of one example of lookup tables (LUTs)

The UCR-black generator 10 generates a K signal according to the CMY signals in the black generation process. More specifically, the K signal is generated from values of Min (C, M, Y) using the LUTs of FIG. 9. The LUTs for conversion from Min (C, M, Y) to K are prepared for the black character and the non-black character, and either one of the LUTs is selected according to the black-character identification signal. The LUT for black character is set so that a black ratio 100%: K=Min (C, M, Y) as shown in FIG. 9. The black is generated by using the LUT here, but it may be calculated by an arithmetic equation.

Further, the UCR-black generator 10 generates C'M'Y'signals in the UCR process by the following equation (2) using the CMY and K signals.

$$C'=C-K$$
$$M'=M-K$$
$$Y'=Y-K \quad (2)$$

If black generation and UCR are performed using the equations (1) and (2) and the LUTs of FIG. 9, then the pixels of R=G=B are converted to a K single color (C'=M'=Y'=0). As the black character portion is corrected to R=G=B in the code embedding unit 4 in the previous stage of the memory 6, the black character portion is surely converted to the K single color.

The copying process (internal process) of the image processing apparatus and the transmission and reception processes with the external device 19 of FIG. 1 are explained below.

In the copying process, RGB signals of a document are read by the scanner 1, a black-character identification signal is generated from the RGB signals in the image area separator 14, the black-character identification signal is embedded in the RGB signals in the code embedding unit 4. The RGB signals with the embedded black-character identification signal is irreversibly compressed in the irreversible compressor 5, and the irreversibly compressed RGB signals are stored in the memory 6. Concurrently with the operation, the black-character identification signal is compressed in the reversible compressor 15 to be stored in the memory 6. The RGB signals with the embedded black-character identification signal stored in the memory 6 are decompressed in the decompressor 7, the black-character identification signal is extracted in the code extractor 8, and the extracted black-character identification signal is output to the selector 17.

Concurrently with the operation, the black-character identification signal stored in the memory 6 is decompressed in the decompressor 16 and is output to the selector 17. The selector 17 selects the black-character identification signal stored in the memory 6 and input from the decompressor 16, and outputs it to the color corrector 9, the UCR-black generator 10, the γ corrector 11, and the pseudo-halftone processor 12. The color corrector 9, the UCR-black generator 10, the γ corrector 11, and the pseudo-halftone processor 12 perform respective image processing on the RGB signals with the embedded black-character identification signal according to the black-character identification signal stored in the memory 6 and input from the selector 17, and a copy image is output from the printer 13.

The RGB signals with the embedded black-character identification signal stored in the memory 6 are transmitted through the external I/F 18, and the corresponding black-character identification signal stored in the memory 6 is deleted. Further, when the image signal with the embedded black-character identification signal that has been received and edited in the external device 19 is returned, the image signal is received through the external I/F 18 and stored in the memory 6. When the RGB signals are to be printed out, the RGB signals with the embedded black-character identification signal stored in the memory 6 are decompressed in the decompressor 7, the black-character identification signal is extracted in the code extractor 8, and the extracted black-character identification signal is output to the selector 17.

The selector 17 outputs the black-character identification signal input from the code extractor 8 to the color corrector 9, the UCR-black generator 10, the γ corrector 11, and the pseudo-halftone processor 12. The color corrector 9, the UCR-black generator 10, the γ corrector 11, and the pseudo-halftone processor 12 perform respective image processing on the RGB signals with the embedded black-character identification signal according to the black-character identification signal input from the selector 17, and an image is printed out from the printer 13.

As explained above, in the image processing apparatus of the first embodiment, the image area separator 14 determines a black character of the RGB signals read by the scanner 1 to generate a black-character identification signal. The code embedding unit 4 embeds the black-character identification signal in the RGB signals and stores the RGB signals with the embedded black-character identification signal in the memory 6. The reversible compressor 15 reversibly compresses the black-character identification signal, and stores it in the memory 6.

When copy output is required, the decompressor 7 decompresses the RGB signals with the embedded black-character identification signal stored in the memory 6, and the decompressor 16 decompresses the compressed black-character identification signal stored in the memory 6, and performs the image processing on the RGB signals with the embedded black-character identification signal according to the decompressed black-character identification signal.

On the other hand, when the RGB signals are to be output to the external device 19, the RGB signals with the embedded black-character identification signal stored in the memory 6 are transmitted through the external I/F 18, and the corresponding black-character identification signal stored in the memory 6 is deleted. Further, when the RGB signals with the embedded black-character identification signal that have been received and edited in the external device 19 are returned, the RGB signals are received through the external I/F 18 and stored in the memory 6.

When the RGB signals with the embedded black-character identification signal that have been edited in the external device 19 is to be printed out, the RGB signals are decompressed in the decompressor 7, the black-character identification signal is extracted from the RGB signals with the embedded black-character identification signal in the code extractor 8, and the RGB signals with the embedded black-character identification signal are subjected to the image processing according to the extracted black-character identification signal.

In such a configuration, when the process is an internal process that does not perform data transmission and reception with the external device 19, the black-character identification signal stored in the memory 6 is read out and is subjected to black character processing. Therefore, it is possible to obtain a reproduced black character image with high quality and to transmit RGB signals that are unspecified. Further, when the RGB signals has been transmitted to the external device and returned again therefrom, the black-character identification signal is extracted from the returned RGB signals, and the extracted black-character identification signal is subjected to black character processing. Therefore, it is possible to obtain a reproduced black character image without degradation.

In other words, in the image processing apparatus of the first embodiment, the first "method of storing an image-area identification signal in memory" is used in combination with the second "method of merging an image-area identification signal in an image". When the image-area identification signal is not transferred to the external device 19, the merits of the first method are made effective use of. That is, the image processing is performed using the black-character identification signal that is not degraded. On the other hand, when the image processing is to be performed on the RGB signals having been transmitted to the external device 19 and edited therein, the merits of the second method are made effective use of. That is, the image processing is performed using the black-character identification signal embedded in the RGB signals. Thus, it is possible to obtain a high-quality reproduced image irrespective of performance of transmission/reception of the RGB signals stored in memory to/from an external device.

Furthermore, in the image processing apparatus of the first embodiment, when a black-character identification signal input from the image area separator 14 is to be output to the code embedding unit 4 and the reversible compressor 15, the switch 20 performs on/off switching on an output of the black-character identification signal thereto according to an image processing mode signal input from the controller (not shown). Therefore, it is possible to switch between execution and non-execution of the black character processing according to an image processing mode, and to perform appropriate image processing according to an image type. More specifically, in the character mode, the switch 20 turns on the output of the black-character identification signal to the code embedding unit 4 and the reversible compressor 15, and turns OFF the output in the photograph mode of photographic paper. Therefore, it is possible to execute the black character processing in the character mode but prevent the execution of the black character processing in the photograph mode of photographic paper.

In the first embodiment, the black-character identification signal extracted in the image area separator 14 is reversibly compressed in the reversible compressor 15 and stored in the memory 6. However, it may be stored in the memory 6 without being compressed. Accordingly, it is possible to use a black-character identification signal with higher accuracy in the image processing in the downstream stages.

Furthermore, in the first embodiment, the image area separator 14 outputs the black-character identification signal to the switch 20. However, the image area separator 14 may output black- and color-character identification signals to the switch 20. Then, the black- and color-character identification signals are embedded in the RGB signals, and the RGB signals are subjected to image processing in the downstream stages of the memory 6, according to the black- and color-character identification signals.

Figure 10:
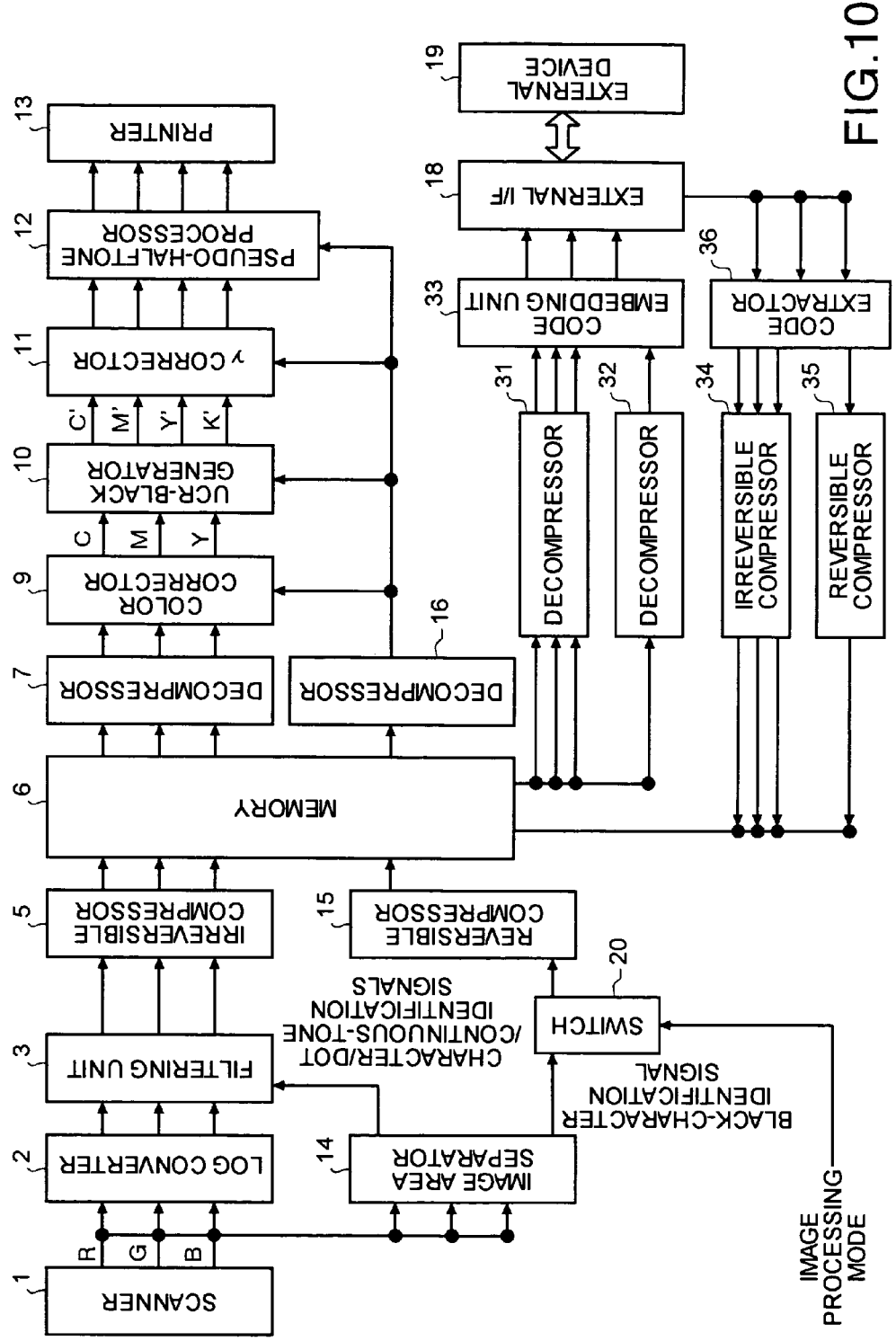
FIG. 10 is a block diagram of an overall configuration of an image processing apparatus according to a second embodiment of the present invention.

An image processing apparatus according to a second embodiment of the present invention is explained below with reference to FIG. 10. FIG. 10 is a block diagram of the overall configuration of the image processing apparatus according to the second embodiment. In the image processing apparatus of the first embodiment (FIG. 1), the black-character identification signal is embedded in the RGB signals captured by the scanner 1 and is extracted irrespective of performance of transmission/reception of the RGB signals to/from the external device 19. However, in the image processing apparatus of the second embodiment, when the RGB signals stored in the memory 6 are transmitted to the external device 19, the black-character identification signal is embedded in the RGB signals. When the RGB signals are received from the external device 19 and are to be stored in the memory 6, the black-character identification signal is extracted from the RGB signals.

The image processing apparatus of FIG. 10 includes a decompressors 31 and 32, a code embedding unit 33, an irreversible compressor 34, a reversible compressor 35, and a code extractor 36 between the memory 6 and the external I/F 18 in the image processing apparatus of FIG. 1.

The schematic operation of the image processing apparatus of FIG. 10 is explained below. The scanner 1 optically scans a color document, converts scanned data to digital RGB signals, and outputs the digital RGB signals to the LOG converter 2 and the image area separator 14.

The LOG converter 2 performs LOG conversion on the RGB signals with linear reflectivity input through the scanner 1 using a lookup table to convert the RGB signals to RGB signals with linear density, and outputs the converted RGB signals to the filtering unit 3.

The image area separator 14 determines image area attributes of the RGB signals input through the scanner 1 pixel by pixel, and outputs the character identification signal, the dot identification signal, and the continuous-tone identification signal to the filtering unit 3. Further, the image area separator 14 outputs the black-character identification signal to the switch 20.

The filtering unit 3 performs filtering on the RGB signals input from the LOG converter 2 based on the character identification signal, the dot identification signal, and the continuous-tone identification signal input from the image area separator 14, and outputs the processed RGB signals to the irreversible compressor 5. More specifically, the filtering is performed in such a manner that the irregularities of a dot portion are prevented to suppress moire while the sharpness of the character portion is enhanced.

The switch 20 performs on/off switching on an output of the black-character identification signal input from the image area separator 14, to the reversible compressor 15 according to an image processing mode signal input from the controller (not shown).

The irreversible compressor 5 performs irreversible compression such as JPEG on the RGB signals input from the filtering unit 3, and stores the compressed RGB signals in the memory 6. The reversible compressor 15 performs reversible compression on the black-character identification signal input from the switch 20, and stores the compressed black-character identification signal in the memory 6. As explained above, the memory 6 stores the RGB signals and the black-character identification signal.

When a copying operation is required (internal process), the decompressor 7 reads the RGB signals irreversibly compressed and stored in the memory 6, and decompresses the RGB signals to be output to the color corrector 9, the UCR-black generator 10, the γ corrector 11, and the pseudo-halftone processor 12 that are provided in the downstream stages. Concurrently with the operation, the decompressor 16 reads the corresponding black-character identification signal stored in the memory 6 and decompresses the black-character identification signal to be output to the downstream stages. The respective image processing is performed on the RGB signals in the color corrector 9, the UCR-black generator 10, the γ corrector 11, and the pseudo-halftone processor 12 according to the black-character identification signal. The UCR-black generator 10 performs erase processing on the black character portion (the processing of forcing values of C'M'Y' to zero).

When the RGB signals stored in the memory 6 are to be transmitted to the external device 19, the decompressor 31 reads the RGB signals compressed and stored in the memory 6, and decompresses the RGB signals, and outputs the decompressed RGB signals to the code embedding unit 33. Concurrently with the operation, the decompressor 32 reads the corresponding black-character identification signal and decompresses it to be output to the code embedding unit 33. The code embedding unit 33 embeds the input black-character identification signal as the black character code in the RGB signals, and transmits the RGB signals with the embedded black-character identification signal to the external device 19 through the external I/F 18. The external device 19 edits the RGB signals.

On the other hand, when the RGB signals having been edited in the external device 19 is received through the external I/F 18, the code extractor 36 extracts the black-character identification signal from the received RGB signals, the irreversible compressor 34 irreversibly compresses the RGB signals to be stored in the memory 6. The reversible compressor 35 reversibly compresses the extracted black-character identification signal to be stored in the memory 6. When the RGB signals stored in the memory 6 are to be printed out, the decompressor 7 reads the RGB signals compressed and stored in the memory 6 and decompresses the RGB signals to be output to the downstream stage. Concurrently with the operation, the decompressor 16 reads and decompresses the black-character identification signal extracted by the code extractor 36 and stored in the memory 6, and outputs the decompressed black-character identification signal to the downstream stages. The respective image processing according to the black-character identification signal is performed on the received RGB signals in the color corrector 9, the UCR-black generator 10, the γ corrector 11, and the pseudo-halftone processor 12.

As explained above, in the image processing apparatus of the second embodiment, when the RGB signals stored in the memory 6 are to be transmitted to the external device 19, the black-character identification signal is embedded in the RGB signals. When the RGB signals are received from the external device 19 and stored in the memory 6, the black-character identification signal is extracted from the RGB signals. Therefore, the black-character identification signal is not embedded in the RGB signals that are used for the internal process such as copying, and the black-character identification signal is not extracted. Therefore, it is possible to reduce a processing time from an input by the scanner to an output by the printer. In the second embodiment, it is also possible to obtain a high-quality black character image irrespective of performance of transmission/reception of the RGB signals to/from the external device 19 like in the first embodiment.

Figure 11:
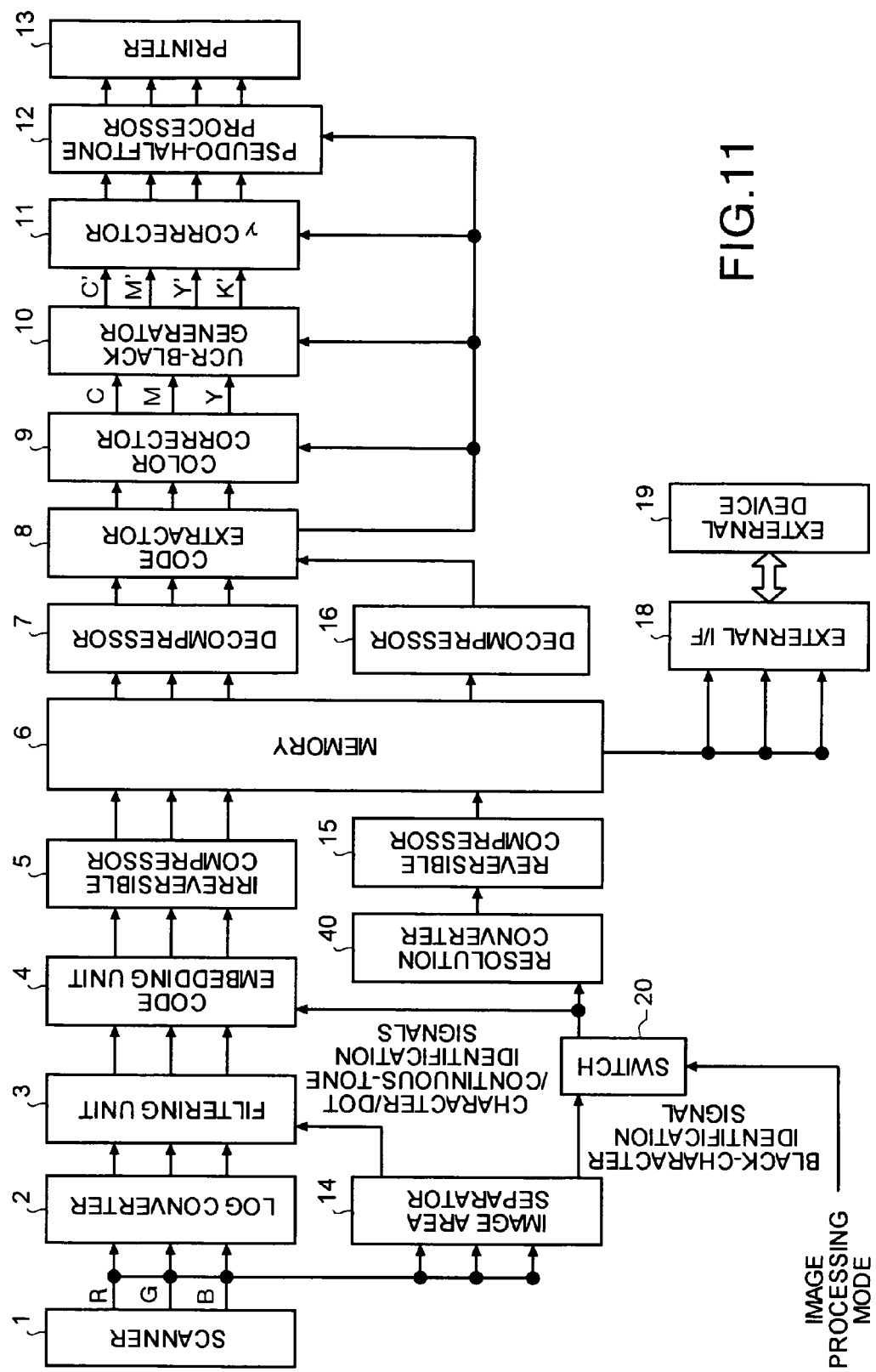
FIG. 11 is a block diagram of an overall configuration of an image processing apparatus according to a third embodiment of the present invention.

An image processing apparatus according to a third embodiment of the present invention is explained below with reference to FIG. 11. FIG. 11 is a block diagram of the overall configuration of the image processing apparatus according to the third embodiment. The image processing apparatus of the third embodiment converts the resolution of a black-character identification signal generated in the image area separator 14 to a reduced resolution and stores the black-character identification signal with the reduced resolution in the memory 6. More specifically, the image processing apparatus of the third embodiment additionally includes a resolution converter 40 between the switch 20 and the reversible compressor 15 in the image processing apparatus of the first embodiment.

The resolution converter 40 converts the resolution of the black-character identification signal input through the switch 20 to a reduced resolution (e.g., the resolution is converted to ⅛ in the main scanning direction and the sub-scanning direction), and outputs it to the reversible compressor 15. The reversible compressor 15 reversibly compresses the input black-character identification signal and stores it in the memory 6.

The black character processing in the processing system (the color corrector 9, the UCR-black generator 10, the γ corrector 11, and the pseudo-halftone processor 12) on downstream side of the memory 6 may be performed by using one of the black-character identification signal stored in the memory 6 and the extracted black-character identification signal in the same manner as that of the first embodiment. In the third embodiment, both of the black-character identification signals are used based on a difference in the resolution between the stored black-character identification signal and the extracted black-character identification signal.

However, when the RGB signals are transmitted to and received from the external device 19, because the corresponding black-character identification signal does not exist in the memory 6, the embedded black-character identification signal is extracted from the RGB signals and used in the same manner as that of the first embodiment.

When the corresponding black-character identification signal exists in the memory 6, the black-character identification signal for black character processing is generated in the manner as follows. When the resolution of the black-character identification signal is reduced to ⅛ in the main scanning direction and the sub-scanning direction in the resolution converter 40, the black-character identification signal that has been read from the memory 6 and decompressed in the decompressor 16 is included, by one per 8×8 pixels, in the RGB signals with the embedded black-character identification signal output from the decompressor 7.

The code extractor 8 generates a high accuracy black-character identification signal with the same resolution as that of the RGB signals using the black-character identification signal that has reduced resolution, yet no degradation because it is reversibly compressed. More specifically, if the black-character identification signal read-out from the memory 6 is "1", the code extractor 8 extracts a black character code embedded in the RGB signals pixel by pixel in the same manner as that of first embodiment (FIG. 7), regarding "1" as that a black character exists within corresponding 8×8 pixels, and the extracted black character code is output as the black-character identification signal. On the other hand, if the black-character identification signal read-out from the memory 6 is "0", the code extractor 8 outputs a result of code extraction such that all the 8×8 pixels are non-black characters as the black-character identification signal, regarding "0" as that no black character exists within the corresponding 8×8 pixels.

The black-character identification signal extracted in the above manner in the code extractor 8 has a lower possibility that erroneous extraction may occur as compared to the case where the black-character identification signal with the reduced resolution stored in the memory 6 is not used. Specifically, the erroneous extraction is such that code may be extracted as a black character in a non-black character portion. Particularly, possibility such that the code may be erroneously extracted in an area apart from the black character can be eliminated. Furthermore, as the black character processing is performed using the extracted black-character identification signal, it is possible to obtain a reproduced black character image with high quality.

In the image processing apparatus of the third embodiment, the resolution of the black-character identification signal is converted to a reduced resolution in the resolution converter 40, the black-character identification signal with the reduced resolution is reversibly compressed in the reversible compressor 15 to be stored in the memory 6. Therefore, the data amount stored in the memory 6 can be reduced, and the memory 6 can be made effective use of. When the process is only the internal process that does not perform data transmission and reception with the external device 19, the code extractor 8 generates a black-character identification signal with the same resolution as that of the RGB signals using the black-character identification signal with the reduced resolution. Then, the RGB signals are subjected to the black character processing according to the generated black-character identification signal, and therefore, it is possible to obtain a reproduced black character image with high quality. In the third embodiment, it is also possible to obtain a high-quality black character image irrespective of performance of transmission/reception of the RGB signals to/from the external device 19.

Figure 12:
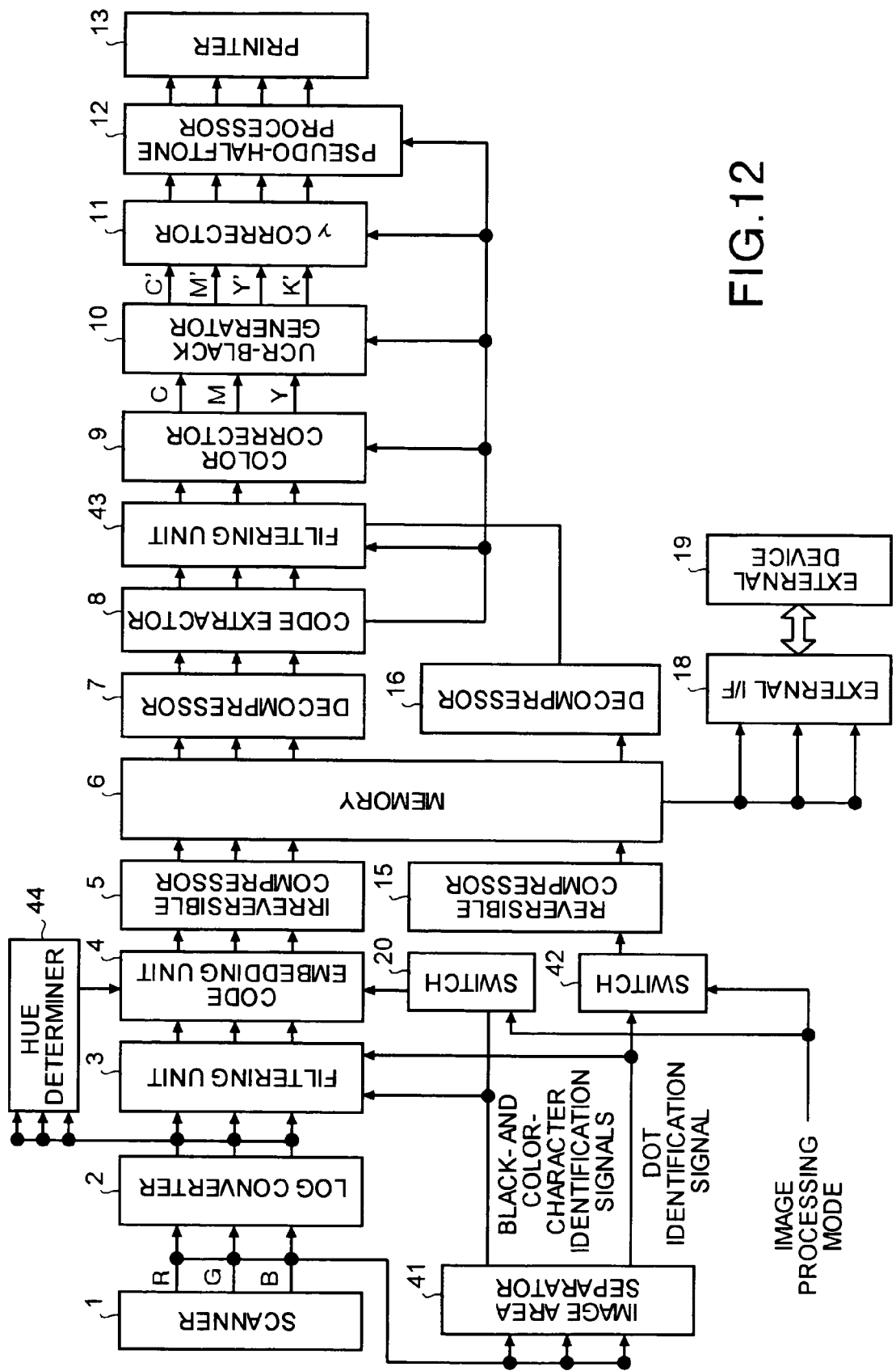
FIG. 12 is a block diagram of an overall configuration of an image processing apparatus according to a fourth embodiment of the present invention.

An image processing apparatus according to a fourth embodiment of the present invention is explained below with reference to FIG. 12. FIG. 12 is a block diagram of the overall configuration of the image processing apparatus according to the fourth embodiment. The image processing apparatus of the fourth embodiment generates a dot identification signal in addition to the black-character identification signal, and outputs the dot identification signal to a filtering unit 43 provided on downstream side of the memory 6, and the filtering unit 43 performs filtering on the dot identification signal according to the dot identification signal. The image processing apparatus of the fourth embodiment has a hue determiner 44 between the LOG converter 2 and the code embedding unit 4, and also has a switch 42 and the filtering unit 43 in the image processing apparatus of the first embodiment.

In the filtering process, in order to achieve compatibility between the sharpness and the graininess/moire, it is desirable to switch the processing according to an image feature in the filters. In the fourth embodiment, an identification signal of "dot" and "color character" (a black character and a color character are ORed to become "character") is output to the filtering unit 43 provided on downstream side of the memory 6, in addition to the black-character identification signal, and the filtering is performed according to the dot identification signal and black- and color-character identification signals.

As the dots are used generally as a background, a high resolution is not required for the background. In the method of "4.1 Dot area detection" by deleting a peak pixel, described in "Image area separation method of a character-pattern (dot, photograph)-mixed image" IEICE Vol. J75-D2, 1992-1, a block is determined. More specifically, it is determined whether the block is a dot block by a predetermined block. Therefore, dots are suitable for storage in the memory because the dots have a reduced resolution and less data amount as compared to the black-character identification signal or the like.

As shown in FIG. 12, an image area separator 41 detects a black character and a color character of the RGB signals input from the scanner 1, and outputs black- and color-character identification signals to the filtering unit 3 and the switch 20. The image area separator 41 also detects dots of the RGB signals input from the scanner 1, and outputs a dot identification signal to the filtering unit 3 and a switch 42.

The filtering unit 3 subjects the RGB signals input from the LOG converter 2 to filtering in such a manner that the sharpness of a character portion is enhanced and irregularities of a dot portion are prevented to suppress moire, based on the black- and color-character identification signals and the dot identification signal input from the image area separator 41, and outputs the processed RGB signals to the code embedding unit 4.

The hue determiner 44 determines the hues of the RGB signals input from the LOG converter 2 based on comparison with thresholds as follows, and outputs the result of hue determination to the code embedding unit 4.

If R≧128 AND G<128 AND B<128, then the hue is cyan.
If R≧128 AND G≧128 AND B<128, then the hue is blue.

The code embedding unit 4 embeds the black- and color-character identification signals input from the switch 20 in the RGB signals, and outputs the RGB signals to the irreversible compressor 5. The code of the color-character identification signal can be embedded, in a method the same as that of "Device for erasing unnecessary color for color character" described in JP-A No. 2001-111850. The code embedding unit 4 erases an unnecessary color (G and B when the hue is cyan) with respect to the hue by referring to the result of the hue determination when the color-character identification signal is "1".

In other words, RGB signals in which one or two colors of RGB are "0" are embedded in the RGB signals as a color character code indicating a color character. The code embedding unit 4 embeds the black character code in the RGB signals when the black-character identification signal is "1", in the same manner as that of the first embodiment.

The irreversible compressor 5 irreversibly compresses the RGB signals input from the code embedding unit 4 to be stored in the memory 6. The reversible compressor 15 reversibly compresses the dot identification signal input from the switch 42 to be stored in the memory 6.

The code extractor 8 extracts the black character code and the color character code from the RGB signals that are decompressed in the decompressor 7 and input therefrom, and outputs black- and color-character identification signals to the processing system in the downstream stages (the color corrector 9, UCR-black generator 10, γ corrector 11, and the pseudo-halftone processor 12). The color character code is extracted in the same method as that of extracting the black character code as shown in FIG. 7.

More specifically, a pixel in which the density of one or two colors of the RGB signals is not more than iro_th (iro_th: predetermined threshold) is determined as a color pixel candidate. The density of the one or two colors of the pixel is set to little more than "0" in consideration of degradation due to irreversible compression. Then, the connection determination, the AND with a white pixel, and the expansion are performed in the same manner as that of extraction of the black character code.

The decompressor 16 reads the dot identification signal that has been reversible compressed and stored in the memory 6, and decompresses it to be output to the filtering unit 43.

The filtering unit 43 subjects the RGB signals input from the code extractor 8 to filtering in such a manner that the sharpness of a character portion is enhanced and the irregularities of a dot portion are prevented to suppress moire, based on the black- and color-character identification signals input from the code extractor 8 and the dot identification signal input from the decompressor 16. The filtering unit 43 then outputs the subjected RGB signals to the color corrector 9.

The color corrector 9 converts the RGB signals input from the filtering unit 43 to CMY signals suitable for a color material of a printer system by masking calculation or the like according to the black- and color-character identification signals input from the code extractor 8, and outputs the CMY signals to the UCR-black generator 10.

The UCR-black generator 10 subjects the CMY signals input from the color corrector 9 to a processing of UCR-black generation to be converted to C'M'Y'K' signals according to the black- and color-character identification signals input from the code extractor 8, and outputs the C'M'Y'K' signals to the γ corrector 11.

The γ corrector 11 converts the C'M'Y'K' signals input from the UCR-black generator 10 to signals linear with respect to the output characteristics of the printer 13, according to the black- and color-character identification signals input from the code extractor 8, and outputs the linear signal to the pseudo-halftone processor 12. The γ corrector 11 is controlled according to the contents of the processing in the pseudo-halftone processor 12. Therefore, the γ corrector 11 corrects a difference between tone characteristics caused by the contents of the pseudo-halftone processing so as to obtain the same density reproduction.

The pseudo-halftone processor 12 performs adaptable dither processing on the C'M'Y'K' signals input from the γ corrector 11 according to the black- and color-character identification signals input from the code extractor 8 so that the sharpness of the black character image is compatible with the graininess and gradation in the dot image and the continuous-tone image. The pseudo-halftone processor 12 outputs processed C'M'Y'K' signals to the printer 13.

When the image signal stored in the memory 6 is to be output to the external device 19, the RGB signals with the embedded black- and color-character identification signals stored in the memory 6 are transmitted through the external I/F 18, and the corresponding dot identification signal stored in the memory 6 is deleted. Further, when the black- and color-character identification signals that have been received and edited in the external device 19 are returned, the black- and color-character identification signals are received through the external I/F 18 and stored in the memory 6.

When the RGB signals are to be printed out, the RGB signals with the embedded black- and color-character identification signals stored in the memory 6 are decompressed in the decompressor 7, the black- and color-character identification signals are extracted from the RGB signals in the code extractor 8, and the black- and color-character identification signals are output to the filtering unit 43, the color corrector 9, the UCR-black generator 10, the γ corrector 11, and the pseudo-halftone processor 12.

The respective image processing is performed on the RGB signals with the embedded black- and color-character identification signals in the filtering unit 43, the color corrector 9, the UCR-black generator 10, the γ corrector 11, and the pseudo-halftone processor 12, according to the black- and color-character identification signals input from the code extractor 8. Then an image is printed out from the printer 13.

As explained above, in the image processing apparatus of the fourth embodiment, in addition to the black-character identification signal, the dot identification signal is generated and output to the filtering unit 43 on downstream side of the memory 6, and the filtering is performed according to the dot identification signal in the filtering unit 43. Therefore, more adaptable image processing is performed on the RGB signals that are subjected to processing for only the internal process such as copying that does not perform data transmission-and reception with the external device 19. Thus, it is possible to obtain a reproduced image with high quality as total image quality. In the fourth embodiment, it is also possible to obtain a high-quality black character image irrespective of performance of transmission/reception of the RGB signals to/from the external device 19 in the same manner as that of the first embodiment.

In the fourth embodiment, the processing (code embedding, extraction, storage in memory, and data transfer to the outside) is performed on the RGB signals, but the present invention is not limited to the processing. Thee present invention may be applied to CMYK signals (black character area: $C=M=Y=0$, code is embedded), $L^*a^*b^*$ signals (black character area: $a^*=b^*=0$, code is embedded), and signals (YUV and YIQ) of a luminance color difference system.

In the fourth embodiment, the explanation is given assuming that the attribute determination signal is not transferred to an external device when the image signal is transferred to the external device. However, when the image signal is transferred to a digital color copying machine of the same model provided in a remote site and is output thereby, it is effective in high quality reproduction to add the attribute determination signal to the image signal and transfer the image signal.

In a device that can transmit and receive an image signal with the attribute determination signal added thereto, switching may be performed between mode of transmitting only the image signal with the embedded attribute determination signal like in this embodiment and mode of transmitting the attribute determination signal and the image signal with the embedded attribute determination signal according to whether the attribute determination signal is included.

Furthermore, the present invention may be applied to a system including a plurality of devices or to a device as a single unit. As the image input unit, the scanner is exemplified, but an imaging unit such as a digital camera may be used for an image input, or an image may be supplied through a network.

The image processing apparatus of the present invention may be applied to a system including a plurality of devices (e.g., a host computer, an interface device, a scanner, and a printer), or to a device as a single unit (e.g., a copying machine, a digital multifunction machine, and a facsimile device).

The present invention is achieved by supplying a recording medium with program code of software for realizing functions of the image processing apparatus recorded therein, to the system or the image processing apparatus, and by executing the program code by the system or a computer or a central processing unit (CPU), a microprocessor unit (MPU), or a digital signal processor (DSP) of the image processing apparatus. In this case, the program code read-out from the recording medium realizes the functions of the image processing apparatus. Therefore, the program code or the recording medium with the program recorded therein forms the present invention. The recording medium for supplying the program code includes an optical recording medium, a magnetic recording medium, an magneto-optical recording medium, and a semiconductor recording medium such as a floppy disk (FD), a hard disk, an optic disk, a magneto-optic disk (MO), a compact disk random access memory (CD-ROM), a compact disk recordable (CD-R), a magnetic tape, a nonvolatile memory, and a random access memory (ROM).

The computer executes the program code read-out to realize the functions of the image processing apparatus. In addition to this, an OS (operating system) running on the computer executes a part of or the whole of actual processing based on the instruction of the program code, and the functions of the image processing apparatus are also realized by the processing.

Furthermore, the program code read-out from the recording medium is written in the memory provided in an extensions board inserted to the computer or in an extensions unit connected to the computer. Then, the CPU provided in the extensions board or the extensions unit executes a part of or the whole of actual processing based on the instruction of the program code, and the functions of the image processing apparatus are also realized by the processing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
   a communication unit configured to exchange data with an external device;
   an attribute determination unit that determines an image attribute of a first image signal on a pixel by pixel basis to generate a dot identification signal and a black-character identification signal;
   an embedding unit that embeds the black-character identification signal in the first image signal in a predetermined format to obtain a second image signal;
   a storage unit that stores the second image signal including the dot identification signal,
   wherein the second image signal is transmitted to the external device through the communication unit and the dot identification signal is deleted;
   an extractor that extracts the black-character identification signal from the second image signal; and
   an image processor that performs predetermined image processing on the second image signal stored, based on the dot identification signal stored and black-character identification signal extracted.

2. The image processing apparatus according to claim 1, further comprising:
   a first compressor that irreversibly compresses one of the first image signal and the second image signal to store the image signal compressed in the storage unit;
   a second compressor that reversibly compresses the attribute signal to store the attribute signal compressed in the storage unit;
   a first decompressor that decompresses the second image signal compressed; and
   a second decompressor that decompresses the attribute signal compressed, wherein
   the extractor extracts the attribute signal from the second image signal decompressed, and
   the image processor performs predetermined image processing on the second image signal decompressed, based on the attribute signal decompressed.

3. The image processing apparatus according to claim 1, further comprising:
   a compressor that irreversibly compresses one of the first image signal and the second image signal to store the image signal compressed in the storage unit; and
   a decompressor that decompresses the second image signal compressed, wherein
   the extractor extracts the attribute signal from the second image signal decompressed.

4. The image processing apparatus according to claim 1, wherein the predetermined image processing includes undercolor removal-black generation.

5. The image processing apparatus according to claim 1, wherein the predetermined image processing includes at least one of color correction, undercolor removal-black generation, $\gamma$ correction, pseudo-halftone processing, and filtering.

6. The image processing apparatus according to claim 1, wherein
   the second image signal is edited in the external device,
   the communication unit receives the second image signal edited from the external device,
   the storage unit stores the second image signal edited,
   the extractor extracts the attribute signal from the second image signal edited, and
   the image processor performs predetermined image processing on the second image signal edited, based on the attribute signal extracted.

7. The image processing apparatus according to claim 1, further comprising a controller that controls whether to store the attribute signal in the storage unit, depending on an image processing mode.

8. The image processing apparatus according to claim 1, further comprising a controller that controls whether to embed the attribute signal in the image signal in the embedding unit, depending on an image processing mode.

9. The image processing apparatus according to claim 1, wherein
   the storage unit stores the first image signal and the attribute signal,
   the embedding unit embeds the attribute signal in the first image signal stored in the storage unit in a predetermined format, and
   the communication unit transmits the first image signal stored in the predetermined format to the external device in which the dot identification signal is deleted and only the black-character identification signal is transmitted.

10. The image processing apparatus according to claim 1, further comprising a resolution converter that converts a resolution of the attribute signal to a lower resolution.

11. The image processing apparatus according to claim 1, wherein the black-character identification signal indicating a black character area.

12. An image processing method, comprising:
    determining an image attribute of a first image signal on a pixel by pixel basis to generate an attribute signal indicating the image attribute;
    embedding the attribute signal in the first image signal in a predetermined format to obtain a second image signal;
    storing the attribute signal and one of the first image signal and the second image signal;
    transmitting the second image signal to an external device;
    deleting the dot identification signal from the second image signal;
    extracting the attribute signal from the second image signal;
    performing predetermined image processing on one of the first image signal and the second image signal that are stored in the storage unit, based on at least one of the attribute signal stored and the attribute signal extracted, to generate a dot identification signal and a black-character identification signal;
    embedding the black-character identification signal in the first image signal in a predetermined format;
    including in the first image signal in the predetermined format the black-character identification signal and the dot identification signal;

extracting at least one of the black-character identification signal and the dot identification signal from first image signal in the predetermined format, and performing predetermined image processing on the first image signal in the predetermined format, based on the black-character identification signal extracted and the dot identification signal stored.

13. The image processing method according to claim 12, further comprising converting a resolution of the attribute signal to a lower resolution.

14. The image processing method according to claim 12, wherein the black-character identification signal indicating a black character area.

15. A computer readable medium encoded with a computer program including computer executable instructions stored on a computer readable medium, wherein the instructions, when executed by the computer, cause the computer to perform:

determining an image attribute of a first image signal on a pixel by pixel basis to generate an attribute signal indicating the image attribute;

embedding the attribute signal in the first image signal in a predetermined format to obtain a second image signal;

storing the attribute signal and one of the first image signal and the second image signal;

transmitting the second image signal to an external device;

deleting the dot identification signal from the second image signal;

extracting the attribute signal from the second image signal;

performing predetermined image processing on one of the first image signal and the second image signal that are stored in the storage unit, based on at least one of the attribute signal stored and the attribute signal extracted, to generate a dot identification signal and a black-character identification signal;

embedding the black-character identification signal in the first image signal in a predetermined format;

including in the first image signal in the predetermined format the black-character identification signal and the dot identification signal;

extracting at least one of the black-character identification signal and the dot identification signal from the first image signal in the predetermined format, and performing predetermined image processing on the first image signal in the predetermined format, based on the black-character identification signal extracted and the dot identification signal stored.

16. The computer readable medium according to claim 15, wherein the instructions further cause the computer to perform converting a resolution of the attribute signal to a lower resolution.

17. The computer readable medium according to claim 15, wherein the black-character identification signal indicating a black character area.

18. The image processing method according to claim 12, further comprising:

deleting the dot identification signal before transmitting the first image signal in the predetermined format to an external device.

19. The computer readable medium according to claim 15, further comprising:

deleting the dot identification signal before transmitting the first image signal in the predetermined format to an external device.

\* \* \* \* \*